United States Patent
Kojima

(10) Patent No.: US 9,796,350 B2
(45) Date of Patent: Oct. 24, 2017

(54) KNEE-PROTECTION AIRBAG DEVICE

(71) Applicant: TOYODA GOSEI CO., LTD., Kiyosu-shi, Aichi-ken (JP)

(72) Inventor: Takahiro Kojima, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/260,447

(22) Filed: Sep. 9, 2016

(65) Prior Publication Data

US 2017/0088081 A1    Mar. 30, 2017

(30) Foreign Application Priority Data

Sep. 30, 2015  (JP) ................................. 2015-193804

(51) Int. Cl.
*B60R 21/206* (2011.01)
*B60R 21/231* (2011.01)

(52) U.S. Cl.
CPC .......... *B60R 21/206* (2013.01); *B60R 21/231* (2013.01); *B60R 2021/23169* (2013.01)

(58) Field of Classification Search
CPC ................ B60R 21/206; B60R 21/231; B60R 2021/23169
See application file for complete search history.

(56) References Cited

U.S. PATENT DOCUMENTS

| | | | |
|---|---|---|---|
| 7,384,065 B2* | 6/2008 | Takimoto .............. | B60R 21/206 280/730.1 |
| 7,604,250 B2* | 10/2009 | Hotta .................... | B60R 21/206 280/728.2 |
| 2007/0200322 A1* | 8/2007 | Sakakida .............. | B60R 21/206 280/730.1 |
| 2008/0238048 A1 | 10/2008 | Ishida | |
| 2011/0156378 A1* | 6/2011 | Matsushima ......... | B60R 21/231 280/730.1 |
| 2011/0193328 A1* | 8/2011 | Fukawatase .......... | B60R 21/201 280/730.2 |
| 2014/0008899 A1* | 1/2014 | Vigeant ............... | B60R 21/2171 280/730.1 |
| 2015/0266443 A1* | 9/2015 | Kojima ................. | B60R 21/217 280/728.2 |
| 2017/0129443 A1* | 5/2017 | Elija ..................... | B60R 21/215 |

FOREIGN PATENT DOCUMENTS

JP    2008-254501 A    10/2008
JP    2013071567 A  *   4/2013

* cited by examiner

*Primary Examiner* — Darlene P Condra
(74) *Attorney, Agent, or Firm* — Posz Law Group, PLC

(57) ABSTRACT

A knee-protection airbag device includes: an airbag being inflatable when an inflating gas flows thereinto; and a casing receiving the airbag in a folded state, wherein: the casing includes an attachment seat portion attached to an attachment bracket disposed to extend from a body; the casing includes an engagement portion engaging with a target engagement portion formed at the attachment bracket; when the engagement portion engages with the target engagement portion while the suspension portion is suspended on the target suspension portion, the airbag assembly is suppressed from rotating backward and deviating in a horizontal direction; and when the attachment seat portion contacts a rear face of a fixation seat portion, the attachment hole formed at the attachment seat portion matches an attachment hole formed at the fixation seat portion.

6 Claims, 17 Drawing Sheets

REAR ←→ FRONT

REAR ⟵⟶ FRONT

CROSS-SECTIONAL VIEW TAKEN ALONG LINE A-A

KNEE-PROTECTION AIRBAG DEVICE

CROSS-REFERENCE TO RELATED APPLICATION(S)

This application is based upon and claims the benefit of priority from Japanese Patent Application No. 2015-193804, filed on Sep. 30, 2015, the entire contents of which are incorporated herein by reference.

BACKGROUND

1. Field of the Invention

The present invention relates to a knee-protection airbag device for fixing an airbag assembly, which is disposed in front of knees of an occupant sitting on a seat and includes an airbag being inflatable when an inflating gas flows thereinto and a casing receiving the airbag in a folded state, to a body by the use of an attachment bracket.

2. Description of the Related Art

In related art, there is known a knee-protection airbag device in which an airbag assembly is fixed to a body in such a manner that a peripheral edge of an attachment hole of an attachment bracket is fixed to a target attachment seat provided in the body by the use of a fixing member while the airbag assembly is temporarily fixed to the body by the use of the attachment bracket disposed to extend from a casing (for example, see JP-A-2008-254501).

In the knee-protection airbag device of the related art, a locking claw used to be temporarily fixed to the body is formed at a position below the attachment hole and above a gravity point of the airbag assembly in the attachment bracket. Then, when the locking claw is locked to a peripheral edge of a locking hole near the body, the airbag assembly can be temporarily fixed to the body so that the attachment hole of the attachment bracket can be disposed at an attachment position of the target attachment seat near the body.

However, in the knee-protection airbag device of the related art, the airbag assembly is temporarily fixed to the body only by the locking claw formed at the attachment bracket and the locking claw is formed by a plate-shaped member disposed so that a width direction follows a vertical direction and is formed in a substantial L-shape in which a front end is directed downward. For this reason, a backward rotational movement of the airbag assembly can be accurately suppressed, but a horizontal movement of the airbag assembly cannot be easily suppressed. Further, the horizontal movement of the airbag assembly during the temporary fixing operation is also regulated. In consideration of this fact, there is a room for improvement.

SUMMARY

The invention is made to solve the above-described problems and an object of the invention is to provide a knee-protection airbag device capable of temporarily fixing an airbag assembly to a body in a stable manner and having satisfactory workability when the airbag assembly is fixed to the body.

According to an aspect of the present invention, there is provided a knee-protection airbag device including: an airbag being inflatable when an inflating gas flows thereinto; and a casing receiving the airbag in a folded state, wherein: the airbag and the casing constitute an airbag assembly, which is disposed in front of knees of an occupant sitting on a seat and which is fixed to a body by the use of an attachment bracket; the casing includes an attachment seat portion attached to the attachment bracket disposed to extend from the body; the airbag assembly is fixed to the body when a peripheral edge of an attachment hole of the attachment seat portion is fixed to a rear face of a fixation seat portion formed at the attachment bracket by the use of a fixing member; the casing is disposed so that a suspension portion suspending on an upper edge of a target suspension portion formed at the attachment bracket extends toward the attachment bracket; the casing includes an engagement portion engaging with a target engagement portion formed at the attachment bracket; when the engagement portion engages with the target engagement portion while the suspension portion is suspended on the target suspension portion, the airbag assembly is suppressed from rotating backward and deviating in a horizontal direction; and when the attachment seat portion contacts the rear face of the fixation seat portion, the attachment hole formed at the attachment seat portion matches an attachment hole formed at the fixation seat portion.

In the knee-protection airbag device of the invention, the attachment seat portion formed at the casing is attached to the attachment bracket disposed to extend from the body so that the airbag assembly is attached to the body. Here, the airbag assembly is fixed to the body in such a manner that the peripheral edge of the attachment hole formed at the attachment seat portion is fixed to the rear face of the fixation seat portion formed at the attachment bracket by the use of the fixing member while the airbag assembly is temporarily fixed to the attachment bracket in such a manner that the suspension portion formed at the casing is suspended on the upper edge of the target suspension portion formed at the attachment bracket and the engagement portion formed at the casing engages with the target engagement portion formed at the attachment bracket. Then, in the knee-protection airbag device of the invention, the downward movement of the airbag assembly is regulated when the suspension portion is suspended on the upper edge of the target suspension portion formed at the attachment bracket and the backward rotation of the airbag assembly with respect to the attachment bracket and the deviation thereof in the horizontal direction are suppressed when the engagement portion engages with the target engagement portion. For that reason, the airbag assembly can be temporarily fixed to the attachment bracket while the deviation in the horizontal direction is suppressed along with the downward movement or the backward rotation. As a result, in the knee-protection airbag device of the invention, if the airbag assembly is temporarily fixed to the attachment bracket by using the suspension portion, the target suspension portion, the engagement portion, and the target engagement portion when the airbag assembly is fixed to the body, the position of the airbag assembly with respect to the attachment bracket can be stabilized even when the airbag assembly is not supported by a hand or the like. Further, the attachment hole formed at the attachment seat portion can match the attachment hole formed at the fixation seat portion when the attachment seat portion is brought into contact with the rear face of the fixation seat portion. As a result, the airbag assembly can be smoothly fixed to the body by using the fixing member.

Thus, in the knee-protection airbag device of the invention, the airbag assembly can be stably and temporarily fixed when the airbag assembly is fixed to the body and thus the workability is satisfactory when the airbag assembly is fixed to the body.

In the knee-protection airbag device with the above-described configuration, the engagement portion and the target engagement portion include: an engagement piece portion, formed at one of the attachment bracket and the casing to extend in an anteroposterior direction, including a regulation neck portion and a locking head portion formed at a front end of the regulation neck portion; and an engagement hole portion, formed at one of the attachment bracket and the attachment seat portion, including an insertion opening used to insert the locking head portion therethrough and a locking opening formed to communicate with the insertion opening and locking the locking head portion by a peripheral edge while the regulation neck portion is inserted therethrough, and the locking opening regulates a relative movement of the regulation neck portion in the horizontal direction by an inner peripheral face to regulate a deviation of the airbag assembly in the horizontal direction and locks the locking head portion by the peripheral edge to regulate a backward movement of the airbag assembly.

In the knee-protection airbag device with such a configuration, when the regulation neck portion is inserted into the locking opening through the insertion opening of the engagement hole portion, the relative movement of the regulation neck portion in the horizontal direction can be regulated by the inner peripheral face of the locking opening and the deviation of the airbag assembly in the horizontal direction can be suppressed. Further, when the locking head portion disposed at the front end of the regulation neck portion is locked by the peripheral edge of the locking opening, the backward rotation of the airbag assembly can be regulated. Further, in the knee-protection airbag device with the above-described configuration, since the locking head portion can be locked to the peripheral edge of the locking opening only when the engagement piece portion is moved so that the regulation neck portion and the locking head portion are inserted into the insertion opening and the regulation neck portion is inserted into the locking opening, the engagement operation is easy and the temporary fixing operation can be smoothly performed even when the working space is narrow due to many peripheral components.

In the knee-protection airbag device with the above-described configuration, when the locking head portion is formed to protrude from the front end of the regulation neck portion toward at least one side in the horizontal direction, the locking head portion can be locked to the peripheral edge of the locking opening in a wide horizontal area and thus the locking head portion can be further strongly locked to the peripheral edge of the locking opening.

In the knee-protection airbag device with the above-described configuration, if the engagement hole portion is formed at the casing, the engagement piece portion protrudes from the periphery toward the attachment bracket. Accordingly, it is possible to easily see the engagement piece portion and to further easily perform the temporary fixing operation when the airbag assembly is temporarily fixed to the attachment bracket compared with the case where the engagement piece portion is provided at the casing.

In the knee-protection airbag device with the above-described configuration, the inner peripheral face of the insertion opening is formed in a tapered shape to the locking opening and is formed as a guide face used to insert the engagement piece portion therethrough. Accordingly, when the regulation neck portion is inserted into the insertion opening and is moved toward the locking opening during the downward movement of the casing, the regulation neck portion can be moved to be inserted into the locking opening while being guided to the guide face. Accordingly, the locking head portion can be automatically disposed at the locking position inside the locking concave portion and thus the regulation neck portion can be further easily inserted into the locking opening.

In the knee-protection airbag device with the above-described configuration, the attachment seat portion and the attachment bracket are formed at both left and right sides of the casing and respectively include the suspension portion and the target suspension portion which correspond to each other and the engagement portion and the target engagement portion which correspond to each other. Accordingly, the airbag assembly can be temporarily fixed to the body with a balance in the horizontal direction, the position of the airbag assembly with respect to the attachment bracket can be further stabilized, and the attachment seat portion can be further stably disposed at the attachment position of the fixation seat portion.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
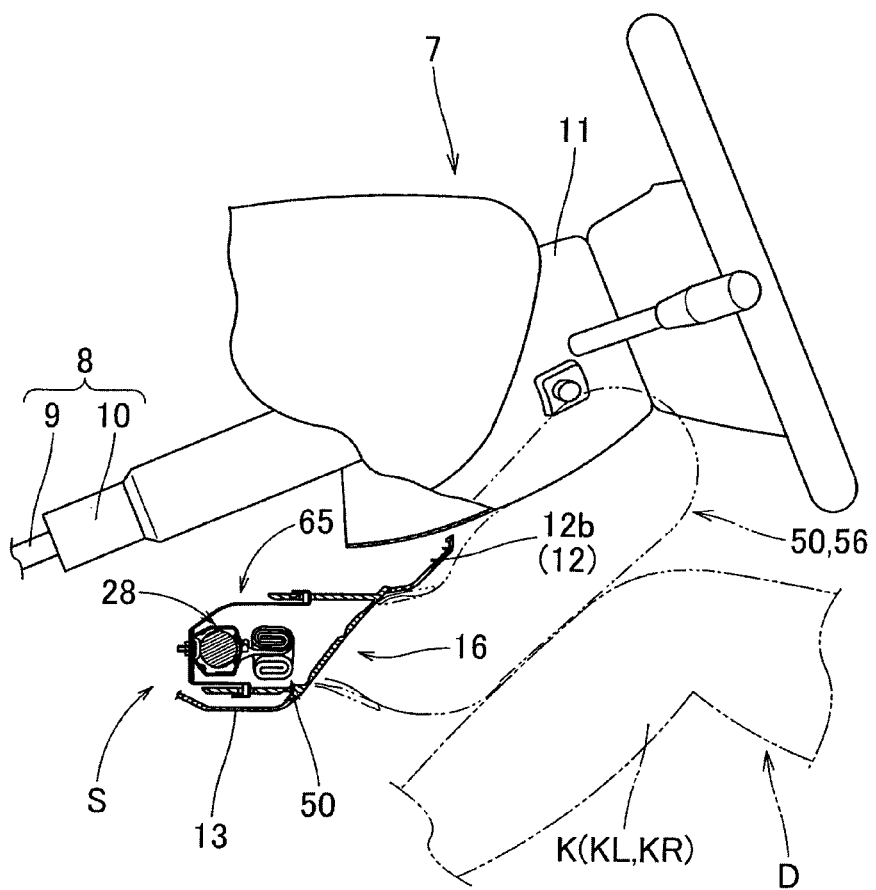
FIG. 1 is a longitudinal cross-sectional view schematically illustrating a state where a knee-protection airbag device of an embodiment of the invention is used when viewed in an anteroposterior direction of a vehicle.
Figure 5:
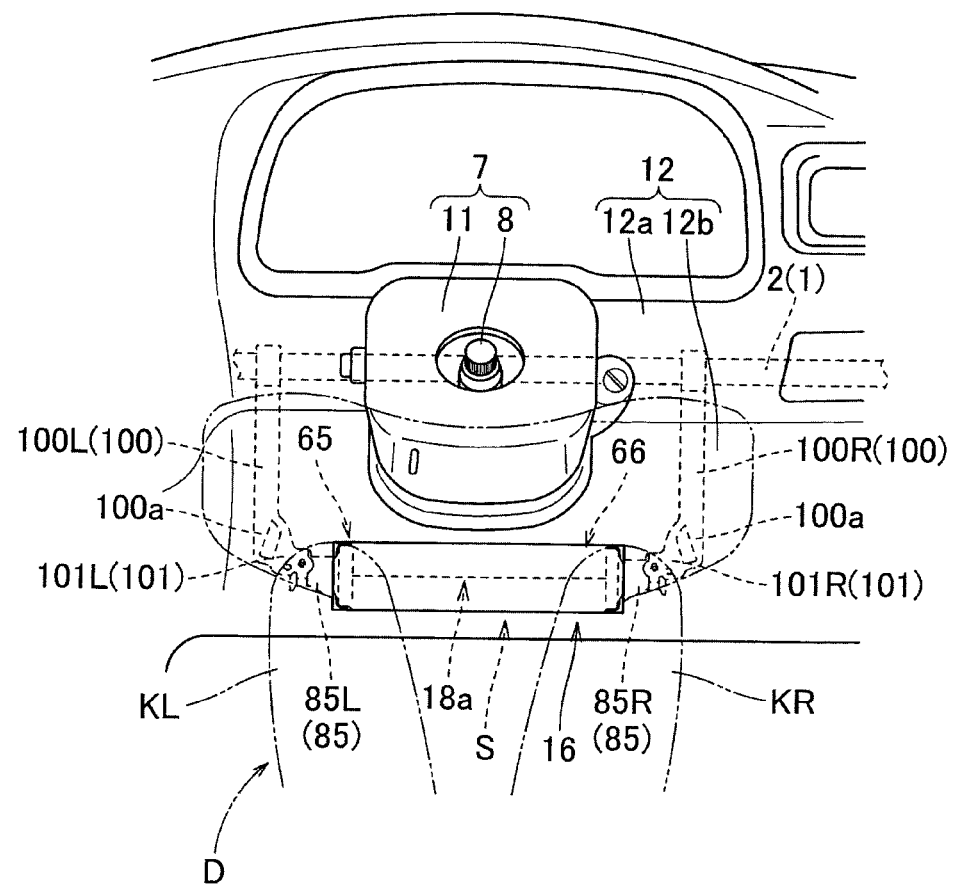
FIG. 5 is a front view schematically illustrating a state where the knee-protection airbag device of the embodiment is used when viewed from a rear side of the vehicle.

Hereinafter, an embodiment of the invention will be described with reference to the drawings. In the embodiment, as illustrated in FIGS. 1 and 5, a knee-protection airbag device (hereinafter, simply referred to as an "airbag device") S which is disposed below a steering column 7 located at the front side of a vehicle in relation to a driver D in order to protect knees K (KL and KR) of the driver D who is an occupant will be exemplarily described. In the specification, the vertical, horizontal, and anteroposterior directions match the vertical, horizontal, and anteroposterior directions of the vehicle when the airbag device S is mounted on the vehicle unless otherwise specified.

The steering column 7 includes, as illustrated in FIGS. 1 and 5, a column body 8 and a column cover 11 which covers the outer circumference of the column body 8. The column body 8 includes, as illustrated in FIG. 1, a main shaft 9 and a column tube 10 which covers the circumference of the main shaft 9.

Figure 2:
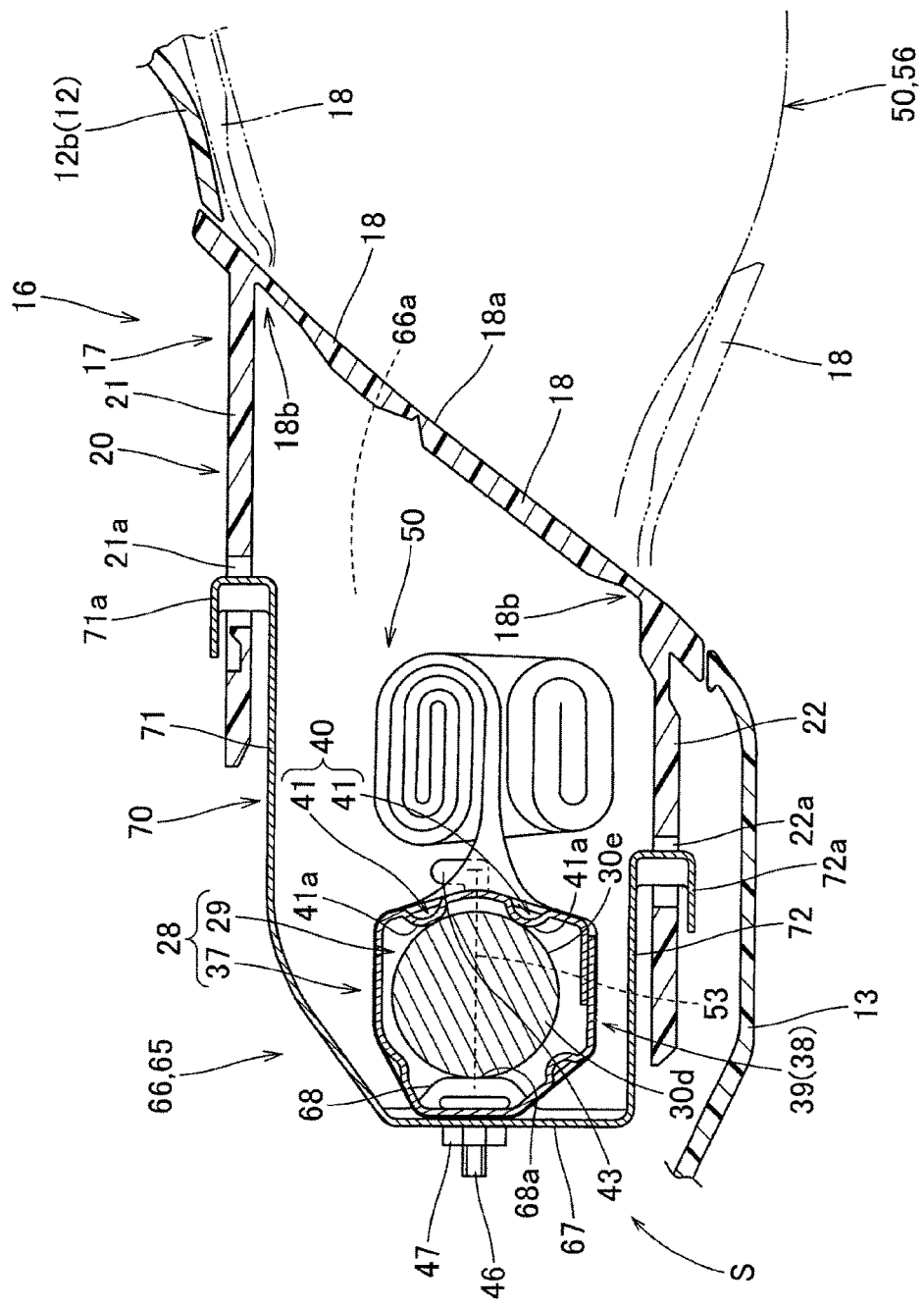
FIG. 2 is an enlarged longitudinal cross-sectional view schematically illustrating the knee-protection airbag device of the embodiment in the anteroposterior direction of the vehicle.
Figure 3:
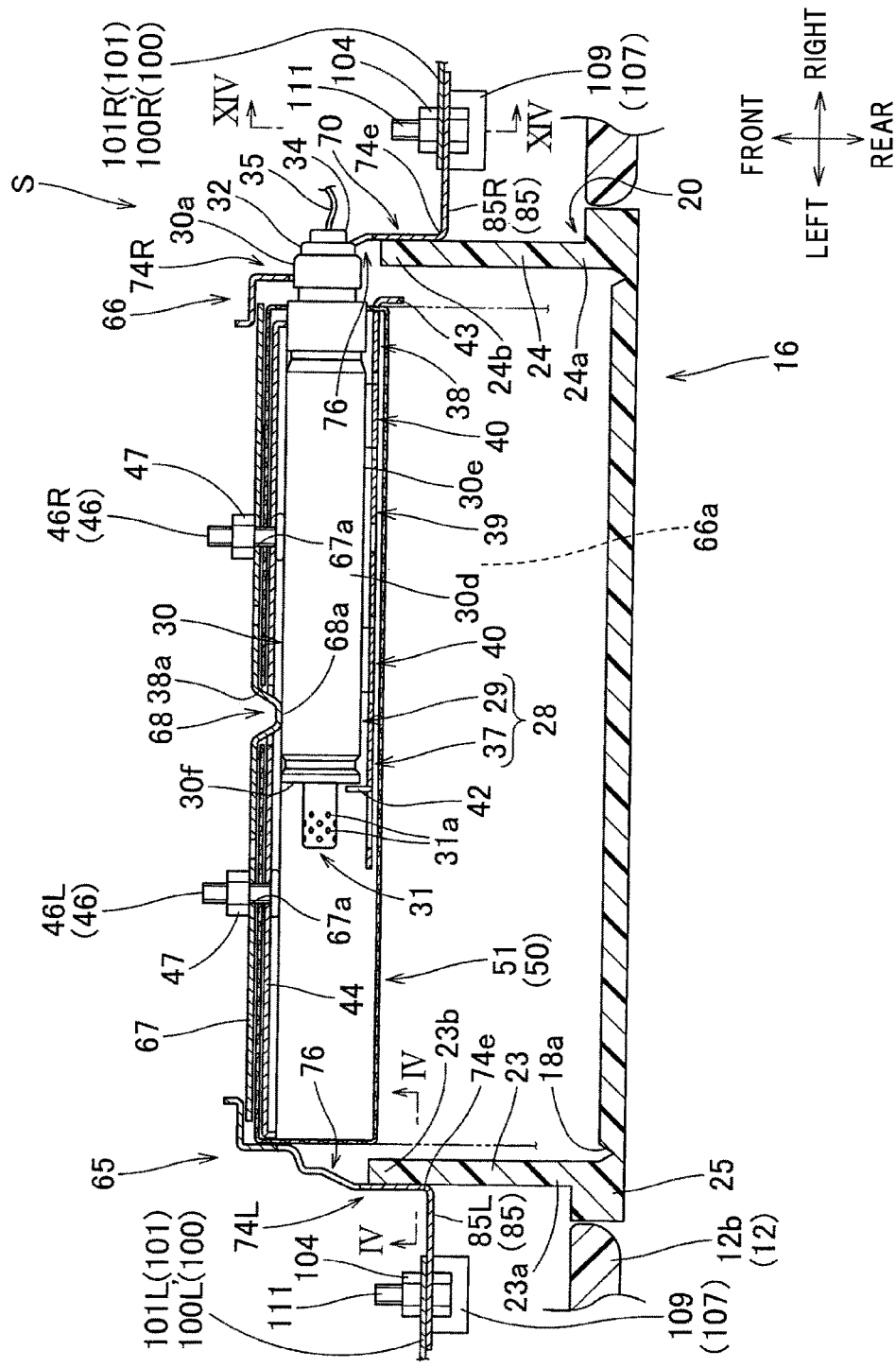
FIG. 3 is a cross-sectional view schematically illustrating the knee-protection airbag device of the embodiment in a horizontal direction of the vehicle.

The airbag device S includes an airbag assembly AM and attachment brackets 100 (100L and 100R) which fix the airbag assembly AM to the body 1 and the airbag assembly AM includes, as illustrated in FIGS. 1 to 3, a folded airbag 50, an inflator 28 which supplies an inflating gas to the airbag 50, a casing 65 which receives the folded airbag 50 and the inflator 28, and an airbag cover 16 which covers the folded airbag 50 at a rear side of the vehicle.

The airbag cover 16 is formed of polyolefin-based thermoplastic elastomer and is configured to cover the casing 65 at the rear side of the vehicle. The airbag cover 16 is disposed, as illustrated in FIGS. 1 to 3, at a lower panel 12b of an instrument panel (hereinafter, simply referred to as an "inner panel") 12 including an upper panel 12a and the lower panel 12b. In the case of the embodiment, the airbag cover 16 includes a door installation portion 17 which is disposed near a projection opening 66a of the casing 65 and a peripheral edge 25 which extends from the periphery of the door installation portion 17.

The door installation portion 17 includes a door portion 18 which covers the projection opening 66a of the casing 65 and a peripheral wall portion 20 which extends forward from the outer peripheral edge of the door portion 18. The door portion 18 is formed in a substantially rectangular plate shape which covers the projection opening 66a of the casing 65 at the rear side of the vehicle. In the embodiment, the door portion 18 is formed such that a thin rupture expected portion 18a (see FIG. 5) having a substantial H-shape when viewed from the rear side of the vehicle and a hinge portion 18b provided at both upper and lower ends to be used as a rotation center when the door portion is opened are disposed in the periphery of the door portion. When the door portion is opened, the door portion is opened in both upper and lower sides.

Figure 6:
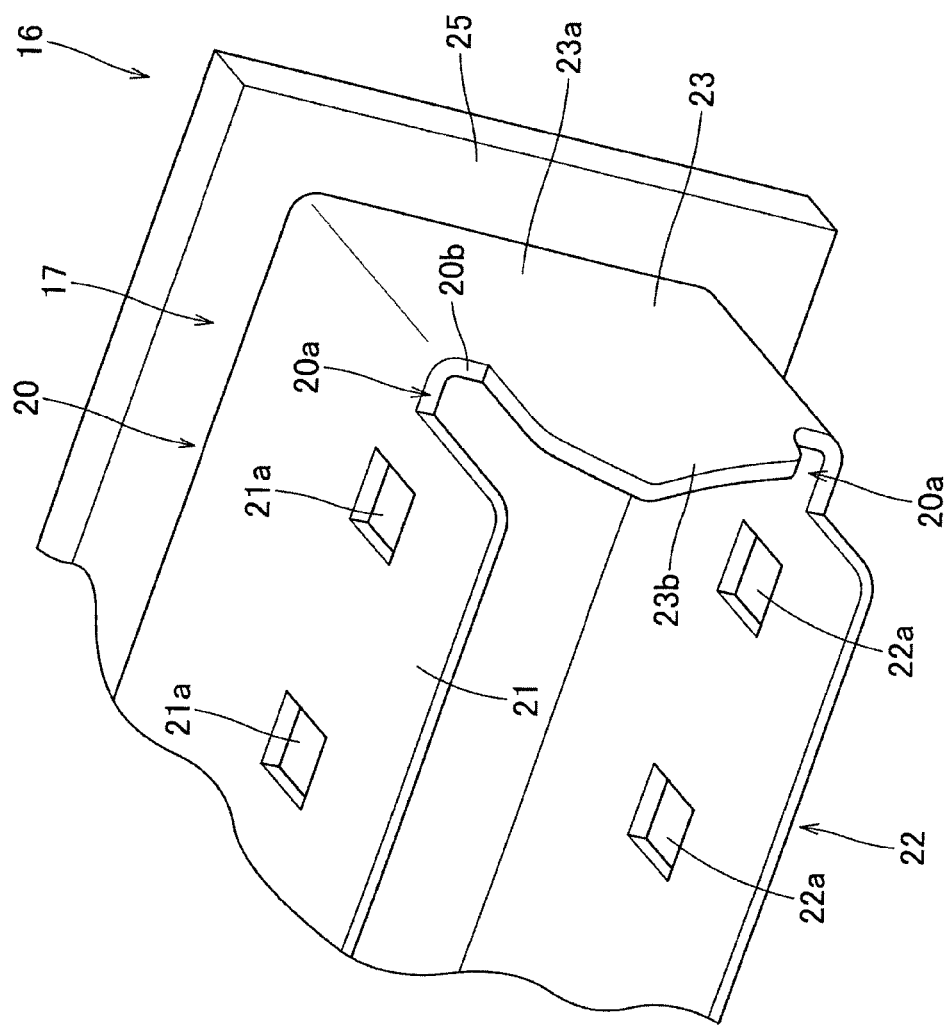
FIG. 6 is a partially enlarged perspective view schematically illustrating an airbag cover used in the knee-protection airbag device of the embodiment when viewed from a front side of the vehicle.

As illustrated in FIGS. 2, 3, and 6, the peripheral wall portion 20 is disposed to extend forward from the peripheral edge of the door portion 18. Here, the peripheral wall portion 20 is formed in a substantially rectangular cylindrical shape in which a portion (a rear end side portion) near the door portion 18 corresponding to a base portion is connected at a circumferential side of a peripheral wall portion 70 of the casing 65 and a front end side portion is formed as a four separate flat plate shape in which the flat plates are separated from each other at a corner portion. That is, the peripheral wall portion 20 is formed to protrude from the peripheral edge of the door portion 18 and includes four side wall portions (an upper wall portion 21, a lower wall portion 22, a left wall portion 23, and a right wall portion 24) disposed near the peripheral wall portion 70 of the casing 65. In the peripheral wall portion 20, the upper wall portion 21 and the lower wall portion 22 which are disposed to face each other in the vertical direction are attached to upper and lower wall portions 71 and 72 of the casing 65 to be described below. In the peripheral wall portion 20, the left wall portion 23 and the right wall portion 24 which are disposed to face each other in the horizontal direction are disposed to cover the inner peripheral portion of the peripheral wall portion 70 of the casing 65 in the case of the embodiment (see FIG. 3).

Figure 4:
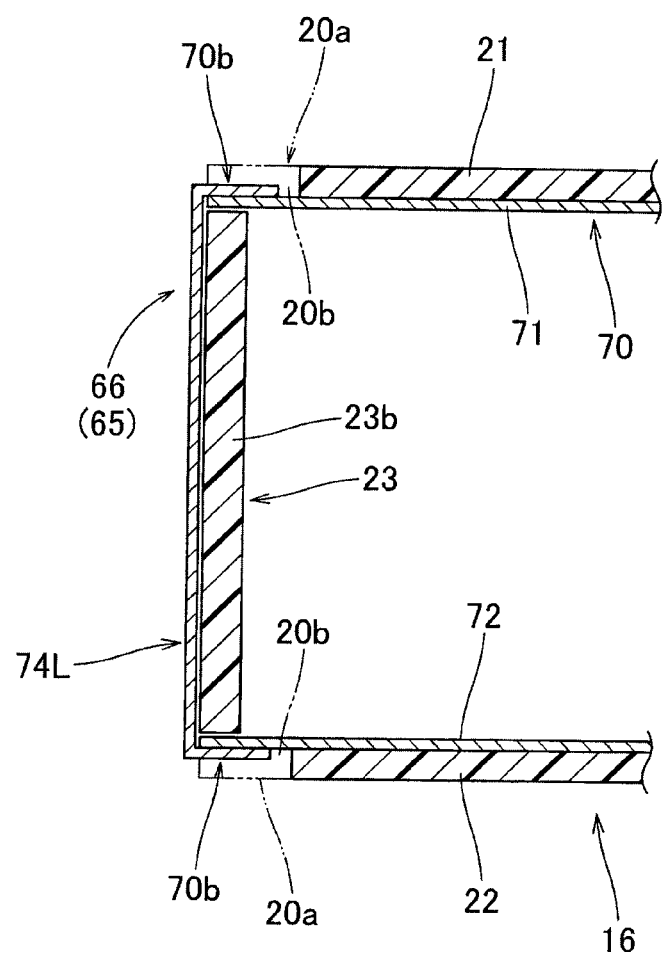
FIG. 4 is a partially enlarged cross-sectional view taken along a line IV-IV in FIG. 3.

As illustrated in FIGS. 2 and 4, the upper wall portion 21 and the lower wall portion 22 are respectively disposed to be adjacent to the outer peripheral portion of the upper wall portion 71 and the lower wall portion 72 in the peripheral wall portion 70 of the casing 65. Then, locking holes 21a and 22a which are opened in a substantially rectangular shape and lock locking claw portions 71a and 72a formed at the upper wall portion 71 and the lower wall portion 72 by peripheral edges thereof are disposed at five positions in the horizontal direction so as to correspond to the locking claw portions 71a and 72a. The left wall portion 23 and the right wall portion 24 are disposed to be respectively adjacent to the inner peripheral portions of a left wall portion 74L and a right wall portion 74R in the peripheral wall portion 70 of the casing 65 (see FIG. 3). In the case of the embodiment, the left wall portion 23 and the right wall portion 24 are formed to cover the inner peripheral portions near a corner portion 70b of a peripheral edge 70a of the projection opening 66a in the peripheral wall portion 70 of the casing 65 as illustrated in FIG. 4. Specifically, in the case of the embodiment, the left wall portion 23 and the right wall portion 24 are formed so that the vertical width dimensions of base portions 23a and 24a are slightly smaller than a separation distance between the upper wall portion 71 and the lower wall portion 72 in the casing 65 and the inner peripheral portions of the left wall portion 74L and the right wall portion 74R of the casing 65 are covered by the base portions 23a and 24a in the entire vertical area as illustrated in FIG. 4. Then, the base portions 23a and 24a of the left wall portion 23 and the right wall portion 24 are disposed so that the portions near the upper and lower edges cover the inner peripheral portion near the corner portion 70b. In the case of the embodiment, the left wall portion 23 and the right wall portion 24 are formed so that the vertical width dimensions decrease to the front ends 23b and 24b separated from the projection opening 66a (see FIG. 6). The front ends 23b and 24b are disposed near a boundary portion between a front end side portion 74d and an inclined portion 74c to be described below in the left wall portion 74L and the right wall portion 74R (see FIG. 3).

As described above, the peripheral wall portion 20 is disposed to extend forward from the peripheral edge of the door portion 18. Then, as illustrated in FIG. 6, the peripheral wall portion 20 is formed in a substantially rectangular cylindrical shape in which a position (a rear end side position) near the door portion 18 corresponding to a base portion is connected at the circumferential side of the peripheral wall portion 70 of the casing 65 and a front end side portion includes the upper wall portion 21, the lower wall portion 22, the left wall portion 23, and the right wall portion 24 which are separated from each other. That is, the peripheral wall portion 20 includes slit-shaped notches formed among the upper wall portion 21, the lower wall portion 22, the left wall portion 23, and the right wall portion 24 so that the portion near the corner portion 70b of the peripheral wall portion 70 of the casing 65 is inserted through the corresponding slit-shaped notch and these wall portions are continuously provided from the notch at the portions near the door portion 18. Here, each slit-shaped notch is a concave portion 20a into which the portion near the corner portion 70b of the peripheral edge 70a of the projection opening 66a of the peripheral wall portion 70 of the casing 65 is insertable (see FIG. 6). The peripheral edge 25 of the airbag cover 16 is disposed at the entire peripheral edge of the door installation portion 17 and extends outward from the door portion 18 so that a rear face thereof is substantially flush with the door portion 18 (see FIGS. 2 and 3).

The inflator 28 includes, as illustrated in FIGS. 2 and 3, an inflator body 29 which has a substantially columnar external shape and a retainer 37 which retains the inflator body 29.

The inflator body 29 is formed in a substantially columnar shape so that an axial direction follows the horizontal direction and includes a main body portion 30 which has a large diameter and a gas ejection portion 31 which has a small diameter and protrudes from one end of the main body portion 30 in the horizontal direction. In the case of the embodiment, the gas ejection portion 31 is disposed at the left end of the main body portion 30. The right end of the main body portion 30 is provided with a connection port 32 to which a connector 34 wired to an operation signal input lead wire 35 is connected (see FIG. 3). In the inflator body 29 of the embodiment, a right end side portion 30a near the connection port 32 in the main body portion 30 is formed to have a diameter slightly smaller than that of a center side portion 30d. In the inflator body 29 of the embodiment, the connection port 32 is formed to have a diameter smaller than that of the right end side portion 30a of the main body portion 30 and is formed to protrude rightward from a right end face 30c of the main body portion 30 (see FIG. 3).

Figure 16:
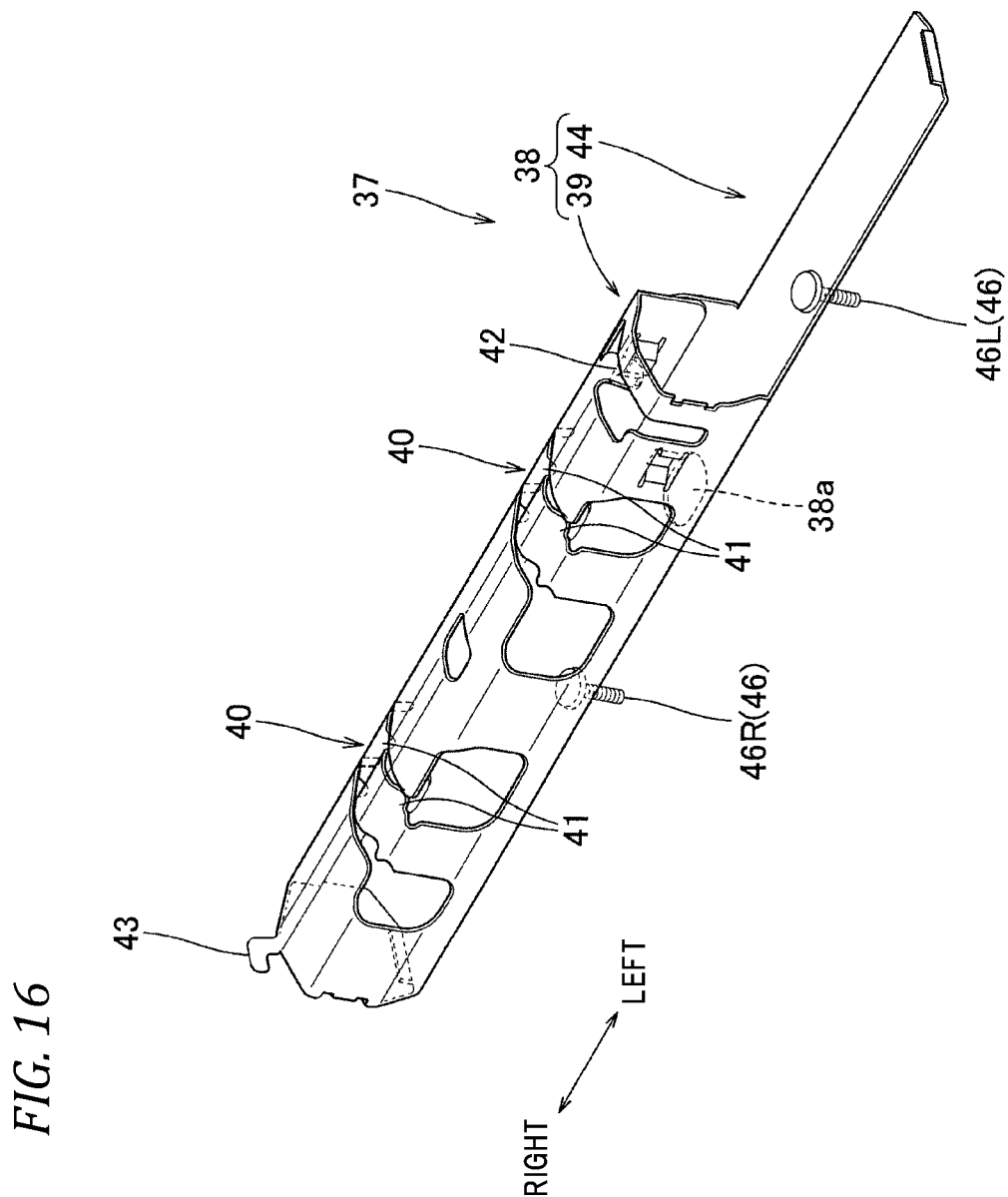
FIG. 16 is a perspective view illustrating a retainer used in the knee-protection airbag device of the embodiment.

The retainer 37 includes, as illustrated in FIGS. 2, 3, and 16, a retaining portion 38 which retains the inflator body 29 and two bolts 46L and 46R which protrude to be substantially orthogonal to an axial direction of the retaining portion 38. The bolts 46L and 46R are disposed to protrude toward the front side of the vehicle from a bottom wall portion 67 of the casing 65 when the airbag device is mounted on the vehicle.

The retaining portion 38 is formed by a metallic plate member and includes a cylindrical portion 39 which retains the inflator body 29 and a plate-shaped portion 44 which extends leftward from the left end of the cylindrical portion 39 as illustrated in FIG. 16. The plate-shaped portion 44 is formed in a flat plate shape which substantially follows the bottom wall portion 67 of the casing 65. In the case of the embodiment, the left bolt 46L is disposed to protrude from the plate-shaped portion 44. In the retaining portion 38, a penetration hole 38a through which a support protrusion 68 formed at the bottom wall portion 67 of the casing 65 is inserted is formed at a position which is located at the front side of the inflator body 29 when the airbag device is mounted on the vehicle and is located between the bolts 46L and 46R. In the cylindrical portion 39, a contact portion 40 which contacts an outer peripheral face 30e of the center side portion 30d of the main body portion 30 when the airbag device is mounted on the vehicle is formed at a portion disposed at the rear side of the main body portion 30 of the inflator body 29 when the airbag device is mounted on the vehicle. The contact portion 40 is formed, as illustrated in FIGS. 3 and 16, at two positions at the left and right sides of the bolt 46R so that the right bolt 46R is interposed therebetween. As illustrated in FIGS. 2 and 16, each contact portion 40 is formed so that two protrusions 41 and 41 are disposed in parallel in the substantially vertical direction in a substantial rear half area of a cross-section in the antero-posterior direction. Each protrusion 41 is formed so that the cylindrical portion 39 is partially recessed toward the inflator body 29, that is, the cylindrical portion 39 protrudes toward the inflator body 29. Here, the protrusion has a substantially semi-circular external shape so that a front end face 41a contacts the outer peripheral face 30e of the center side portion 30d of the main body portion 30 of the inflator body 29 (see FIG. 2).

The vicinity of the left end of the cylindrical portion 39 is provided with a projection piece 42 which protrudes toward the inner periphery so that the inflator body 29 is positioned when the inflator body 29 is inserted into the cylindrical portion. As illustrated in FIG. 3, the projection piece 42 is used to position the gas ejection portion 31 inside the retainer 37 by regulating the leftward movement of the main body portion 30 while contacting an end face (a left end face 30o near the gas ejection portion 31 in the main body portion 30 of the inflator body 29. The right end of the cylindrical portion 39 is provided with a locking claw portion 43 which protrudes from an opening slit 53 when the retainer 37 is received in the airbag 50 from the inflator insertion opening slit 53 to be described below and the airbag 50 is folded (see FIG. 2). The locking claw portion 43 protrudes backward from the rear edge when the airbag device is mounted on the vehicle and is formed in a substantial L-shape so that the front end is directed upward. The airbag device S of the embodiment has a configuration in which the airbag 50 is folded while the retainer 37 is received therein and the inflator body 29 is inserted from the opening slit 53 into the airbag 50 to be inserted into the retaining portion 38 (the cylindrical portion 39) of the retainer 37 during an assembly operation. The locking claw portion 43 is disposed to prevent the retaining portion 38 of the retainer 37 received in the airbag 50 from being deviated from the opening slit 53.

Then, in the airbag device S of the embodiment, when the inflator body 29 is received in the retaining portion 38 of the retainer 37 disposed inside the airbag 50 and the airbag 50 is received in the casing 65, the bolt 46 of the retainer 37 protrudes from the bottom wall portion 67 of the casing 65 and a nut 47 is fastened to the bolt 46 so that the inflator 28 and the airbag 50 are attached to the casing 65. Specifically, when the nut 47 is fastened to the bolt 46, the inflator body 29 is retained by the retainer 37 while being sandwiched by the support protrusion 68 which is formed at the bottom wall portion 67 of the casing 65, a guide portion 78 which is formed at the front edge of the connector opening 76 of the right wall portion 74R of the casing 65, and the contact portions 40 and 40 which are formed at the retaining portion 38 of the retainer 37.

In the case of the embodiment, the airbag 50 is formed by a woven fabric of flexible polyester or polyamide. Then, when the airbag 50 is completely inflated, the airbag 50 is formed in a substantially rectangular plate shape as indicated by the two-dotted chain line in FIG. 5 in order to protect the left and right knees K (KL and KR) of the driver D. In the case of the embodiment, as illustrated in FIG. 17, the airbag 50 includes an attachment portion 51 which is disposed inside the casing 65 when the airbag 50 is completely inflated and a protection inflation portion 56 which is formed to have a horizontal width larger than that of the attachment portion 51 and protects the knees K (KL and KR) of the driver D when the airbag 50 is completely inflated.

Figure 17:
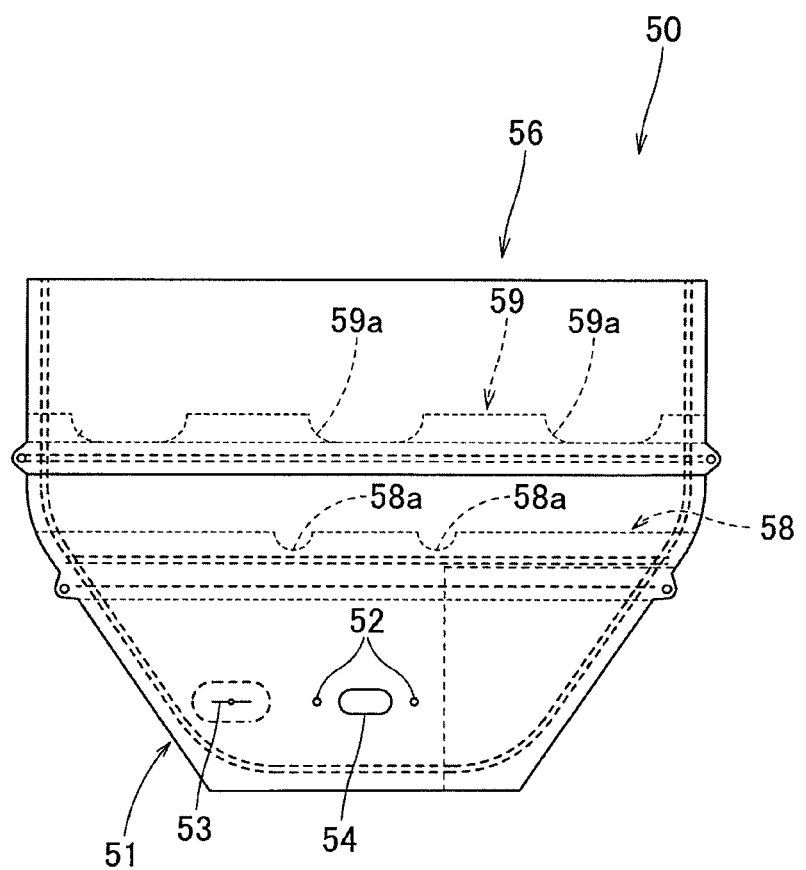
FIG. 17 is a rear view illustrating an airbag used in the knee-protection airbag device of the embodiment.

The attachment portion 51 is provided with, as illustrated in FIG. 17, two insertion holes 52 and 52, the opening slit 53, and a penetration hole 54. The insertion holes 52 and 52 are used to respectively insert the bolts 46 of the retainer 37 therethrough. The opening slit 53 is used to insert the retainer 37 and the inflator body 29 into the airbag 50 and is formed in a linear shape which substantially follows the horizontal direction while the airbag 50 is flatly expanded. The penetration hole 54 is used to insert the support protrusion 68 formed at the bottom wall portion 67 of the casing 65 therethrough and is formed between the insertion holes 52 and 52.

The airbag 50 of the embodiment includes therein two tethers 58 and 59 which are separated from each other in the vertical direction and regulate a thickness of the airbag 50 when the airbag 50 is completely inflated while two tethers 58 and 59 respectively follow the horizontal direction (see FIG. 17). The tether 58 is disposed to define the attachment portion 51 and the protection inflation portion 56 and the tether 59 is disposed to define the upper and lower areas of the protection inflation portion 56. The tethers 58 and 59 are respectively provided with a plurality of gas flow passage holes 58a and 59a through which an inflating gas flows.

The casing 65 is formed by a metallic plate member and includes, as illustrated in FIGS. 2, 3, and 7 to 11, a casing body 66 which receives the folded airbag 50 and the inflator 28 and attachment seat portions 85 (85L and 85R) which attach the casing body 66 to the attachment brackets 100 (100L and 100R) extending from the body 1.

Figure 7:
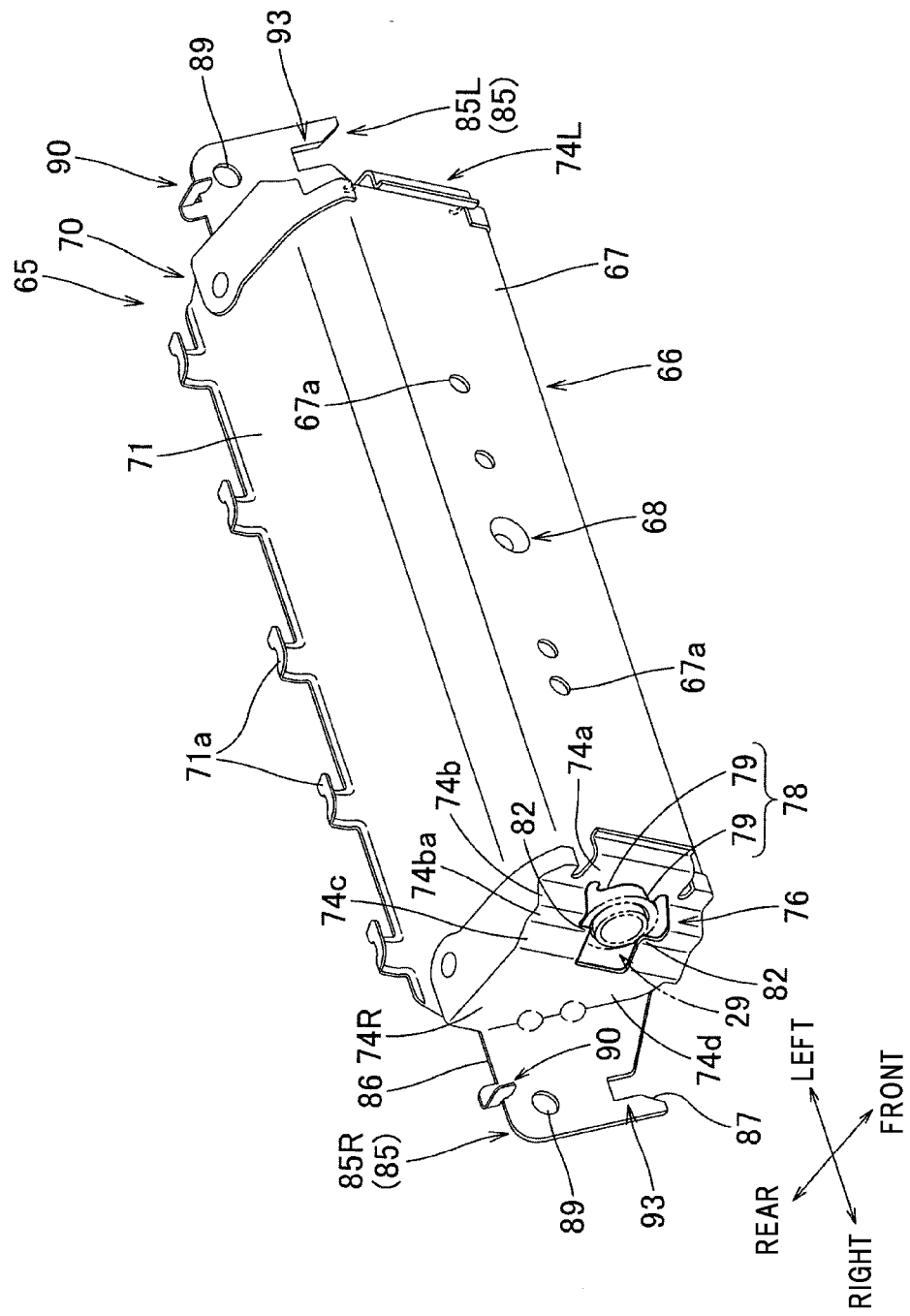
FIG. 7 is a perspective view illustrating a casing used in the knee-protection airbag device of the embodiment when viewed from the front side of the vehicle.

The casing body 66 has a substantial box shape as illustrated in FIGS. 3 and 7 and includes the bottom wall portion 67 which is disposed at the front side of the vehicle and has a substantially square shape and the peripheral wall portion 70 which extends backward from the peripheral edge of the bottom wall portion 67 in the anteroposterior direction and has a substantially square cylindrical shape. Here, the rear end of the peripheral wall portion 70 is provided with the projection opening 66a through which the airbag 50 protrudes. In the case of the embodiment, as illustrated in FIG. 2, the projection opening 66a is inclined backward and upward with respect to the vertical direction so that an upper side of an opening face is located at the rear side and a lower side thereof is located at the front side. In the case of the embodiment, the casing body 66 is formed in a substantially flat box shape having a large horizontal width dimension.

Specifically, the bottom wall portion 67 is formed in a substantially rectangular plate shape which is wide in the horizontal direction and includes two insertion holes 67a and 67a which are provided in the horizontal direction so that the bolts 46 (46L and 46R) provided in the retainer 37 are inserted therethrough. In the bottom wall portion 67, the support protrusion 68 which protrudes toward the inside (the inflator 28) of the casing body 66 along the protruding direction of the bolts 46 is provided at a substantial center position between the insertion holes 67a and 67a. The support protrusion 68 is formed in a substantially truncated cone shape. When the airbag device is mounted on the vehicle, a front end having a substantially plane shape is brought into contact with the outer peripheral face 30e of the center side portion 30d of the main body portion 30 of the inflator body 29 so that the inflator body 29 is supported (see FIGS. 3 and 8). The support protrusion 68 is formed at a substantial center position of the bottom wall portion 67 in the horizontal direction.

The peripheral wall portion 70 includes the upper and lower wall portions 71 and 72 which are disposed to face each other in the vertical direction and the left and right wall portions 74L and 74R which are disposed to face each other in the horizontal direction so that the upper wall portion 71 and the lower wall portion 72 are connected. The upper wall portion 71 and the lower wall portion 72 are used to attach the upper wall portion 21 and the lower wall portion 22 of the airbag cover 16 thereto. Here, the locking claw portions 71a and 72a which lock the peripheral edges of the locking holes 21a and 22a formed at the upper wall portion 21 and the lower wall portion 22 are disposed near the rear ends which are close to the edge near the projection opening 66a. The locking claw portions 71a and 72a are bent while protruding outward in the vertical direction so that the front ends thereof are directed toward the bottom wall portion 67 (the front side of the vehicle). In the case of the embodiment, the upper wall portion 71 and the lower wall portion 72 are provided at five positions in the horizontal direction.

In the case of the embodiment, the left wall portion 74L and the right wall portion 74R are formed to be bilaterally symmetrical to each other. In the embodiment, the right wall portion 74R which is disposed near the connector 34 of the inflator body 29 will be described in detail as an example.

The right wall portion 74R is formed to have a step so that a portion near the bottom wall portion 67 (the front end side) is located at the inside (the left side) in the horizontal direction and a portion near the projection opening 66a (the rear end side) is located at the outside (the right side) in the horizontal direction. Specifically, in a horizontal cross-section illustrated in FIG. 8, the right wall portion 74R has a step formed by arranging a front base side portion 74a which is substantially disposed in the anteroposterior direction, a stepped portion 74b which is bent between the front base side portion 74a and the rear front end side portion 74d, and the inclined portion 74c which is continuous to the stepped portion 74b and is inclined toward the front end side portion 74d. The stepped portion 74b is continuous to the base side portion 74a and is formed in a step shape so that the rear side portion 74ba is directed outward in the horizontal direction and the inclined portion 74c is inclined so that the front end side continuous from the rear side portion 74ba of the stepped portion 74b is directed inward in the horizontal direction and the rear end side continuous to the front end side portion 74d is directed outward in the horizontal direction. The right wall portion 74R is formed backward and upward by inclining the rear edge 74e forming the peripheral edge of the projection opening 66a along the opening face of the projection opening 66a with respect to the vertical direction so that an upper side is located at the rear side and a lower side is located at the front side.

Figure 9:
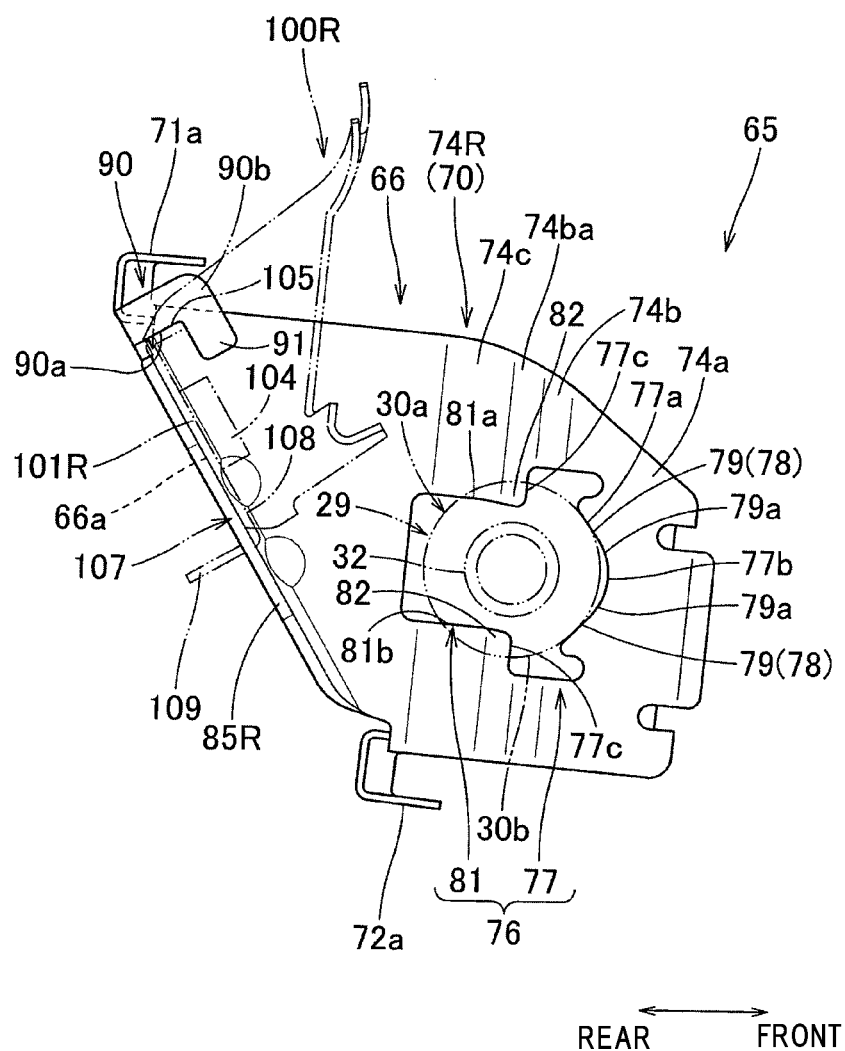
FIG. 9 is a right side view illustrating the casing in FIG. 7.

The right wall portion 74R is provided with the connector opening 76 through which the connection port 32 is exposed so that the connector 34 is connectable to the connection port 32 while the inflator 28 is attached to the casing 65. As illustrated in FIG. 9, the connector opening 76 is formed from the base side portion 74a to the front end side portion 74d across the stepped portion 74b. Specifically, the connector opening 76 includes an opening body 77 which is formed in an area from the base side portion 74a to an intermediate portion of the stepped portion 74b and an auxiliary opening 81 which is formed in an area from the rear end of the stepped portion 74b to the front end side portion 74d.

As illustrated in FIG. 9, the opening body 77 has a large vertical width and is bent so that the opening width is widened from the front edge 77a to the rear side (the projection opening 66a) when viewed from a right side. The opening body 77 is formed in a size in which only the connection port 32 of the inflator body 29 is insertable therethrough and the inflator body 29 (the main body portion 30) is not insertable therethrough. Specifically, the opening body 77 is formed so that a substantial half area of the right end side portion 30a can be exposed by a configuration in which a vertical opening width dimension is set to be larger than an outer diameter dimension of the right end side portion 30a of the inflator body 29 (see the two-dotted chain line in FIG. 9). Then, the front edge 77a which is bent in the opening body 77 is provided with the guide portion 78 which guides the inflator body 29 to a retaining position using a projection piece 82 to be described later when the inflator 28 is attached to the casing 65. The guide portion 78 is formed at the front edge 77a of the opening body 77 and includes two guide faces 79 which are disposed to face each other in the vertical direction orthogonal to the axis of the inflator body 29 and are disposed to shorten a separation distance toward the bottom wall portion 67. In other words, the guide face 79 is formed to shorten a separation distance toward the movement direction of the inflator body 29 when the nut 47 is fastened to the bolt 46. In the case of the embodiment, the guide faces 79 are disposed to be inclined with respect to the vertical direction while being symmetrical to each other. Then, the guide face 79 is formed to allow the sliding movement of a portion near the outer peripheral face 30b of the right end side portion 30a near the connection port 32 in the inflator body 29 while keeping a contact state with respect to the outer peripheral face 30b of the right end side portion 30a near the connection port 32 of the inflator body 29 when the nut 47 is fastened to the bolt 46.

The auxiliary opening 81 is formed in a substantially rectangular shape having a vertical opening width dimension smaller than that of the opening body 77 and extends backward (toward the projection opening 66a) while communicating with the opening body 77. The opening width dimension of the auxiliary opening 81 is also set to a dimension in which the connection port 32 of the inflator body 29 is insertable through the auxiliary opening 81.

Figure 8:
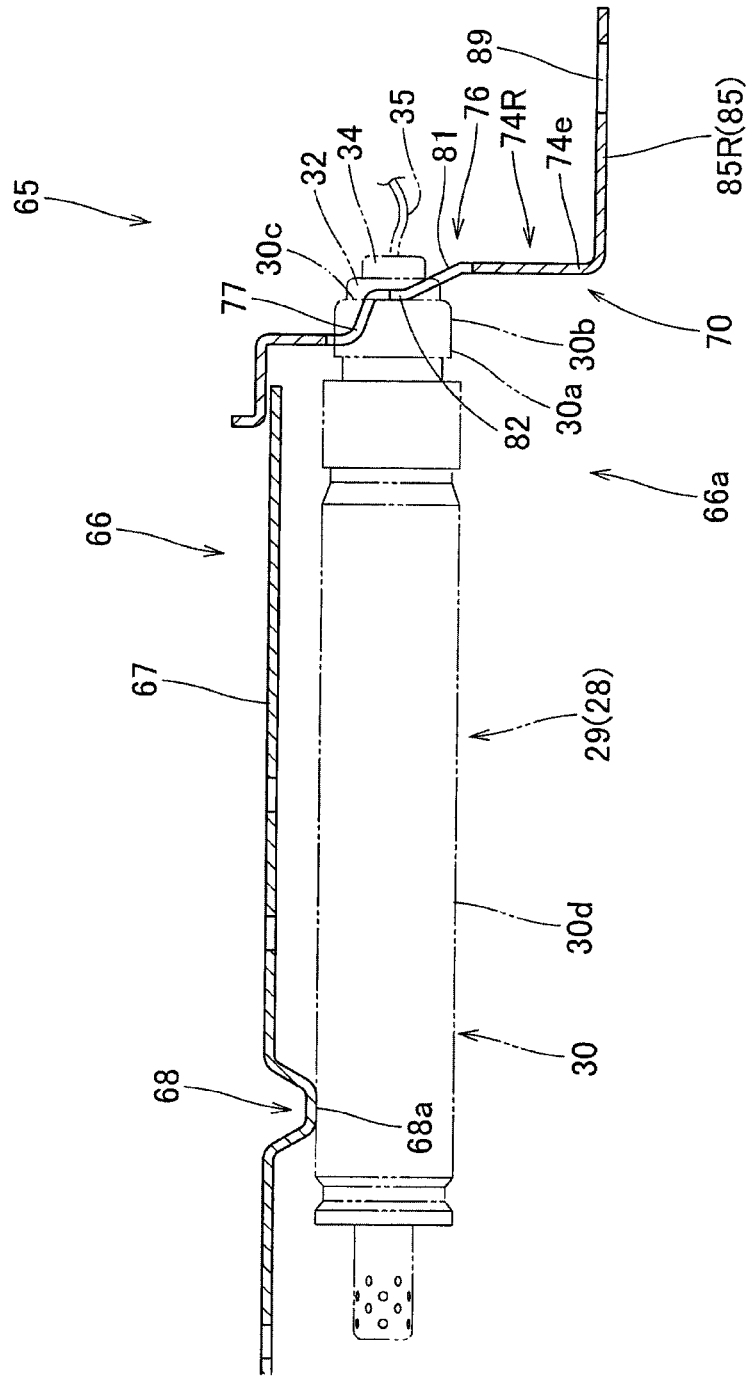
FIG. 8 is a partially enlarged cross-sectional view illustrating the casing in FIG. 7.

Then, in the embodiment, a portion near the boundary portion between the auxiliary opening 81 and the opening body 77 in the peripheral edge of the connector opening 76 forms the retaining projection piece 82 of the inflator 28. The projection piece 82 is formed at two opposite positions in a direction (the vertical direction) orthogonal to the axis of the bolt 46 formed at the retainer 37 and is formed in the rear end side area (the rear side portion 74ba) of the stepped portion 74b of the right wall portion 74R (see FIGS. 8 and 9). That is, as illustrated in FIG. 8, the projection piece 82 is disposed at the outside in the axial direction of the inflator 28 (the inflator body 29) (the outside in the horizontal direction) in relation to the guide portion 78 disposed in an area of the base side portion 74a in the right wall portion 74R. Thus, when the nut 47 is fastened to the bolt 46 so that the inflator 28 is attached to the casing 65, the right end face 30c of the peripheral edge of the connection port 32 of the inflator body 29 can be pressed while the portion near the outer peripheral face 30b of the right end side portion 30a is supported by the guide portion 78. Although not illustrated in detail in the drawings, in the casing body 66 of the embodiment, the left wall portion 74L is also provided with the connector opening 76 as illustrated in FIG. 3 and the connector opening 76 has the same configuration as that of the connector opening 76 formed at the right wall portion 74R.

As illustrated in FIGS. 3, 5, and 7, the attachment seat portions 85 (85L and 85R) which attach the casing 65 (the airbag assembly AM) to the body 1 are formed at both left and right positions of the casing 65. In the case of the embodiment, the attachment seat portions 85 (85L and 85R) are respectively formed at the rear edges 74e of the left wall portion 74L and the right wall portion 74R of the casing body 66 to extend outward in the horizontal direction. That is, in the embodiment, the attachment seat portions 85 (85L and 85R) are inclined backward and upward with respect to the vertical direction along the rear edges 74e of the left wall portion 74L and the right wall portion 74R (the opening face of the projection opening 66a) so that an upper side is located at the rear side and a lower side is located at the front side. In the case of the embodiment, the attachment seat portions 85 (85L and 85R) are formed by curving a metallic plate member so that the left wall portion 74L and the right wall portion 74R are integrally formed. The attachment seat portions 85 (85L and 85R) are also symmetrical to each other in the horizontal direction.

Figure 10:
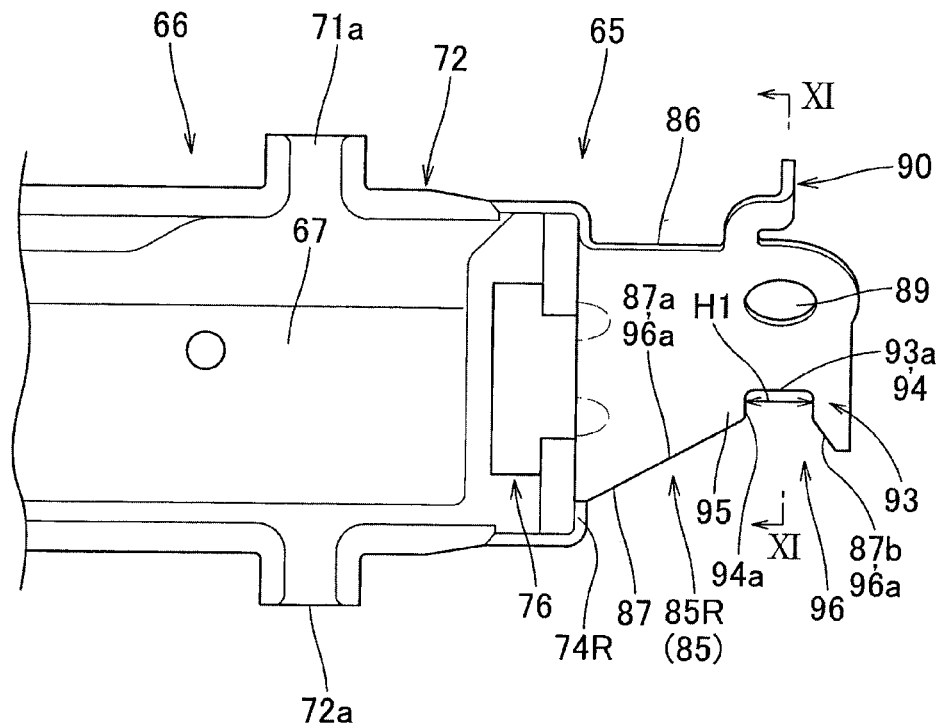
FIG. 10 is a partially enlarged front view illustrating the casing in FIG. 7 when viewed from the rear side of the vehicle.

As illustrated in FIG. 10, the attachment seat portions 85 are formed in a substantially trapezoidal flat plate shape which extends outward in the horizontal direction from the substantially entire areas of the rear edges 74e of the left wall portion 74L and the right wall portion 74R so that the width is narrowed outward in the horizontal direction (toward the front end). Further, an attachment hole 89 through which a bolt 111 corresponding to a fixing member is insertable is formed at a position which is at the outside in the horizontal direction and is an upper outer end located above. An upper edge 86 of the attachment seat portion 85R is provided with a suspension portion 90 which can be suspended on the upper edge of the target suspension portion 105 formed at the attachment bracket 100. Further, a lower edge 87 of the attachment seat portion 85 is provided with an engagement hole portion 93 which is an engagement portion which can engage with an engagement piece portion 107 (a target engagement portion) formed at the attachment bracket 100.

Figure 11:
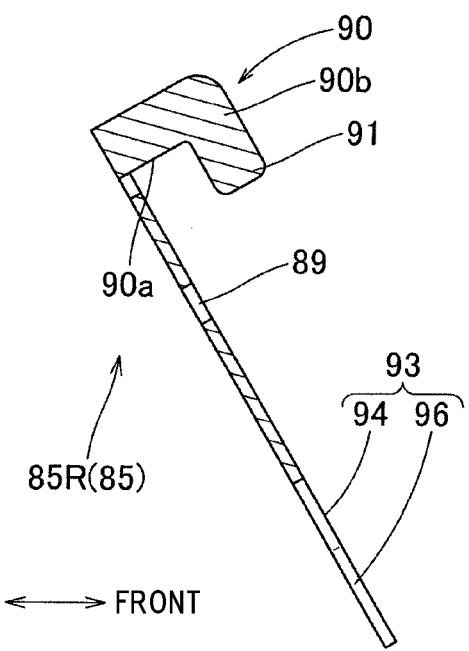
FIG. 11 is a partially enlarged cross-sectional view taken along a line XI-XI in FIG. 10.

Specifically, the suspension portion 90 is disposed at a position substantially right above the attachment hole 89 near the upper edge 86 of the attachment seat portion 85 and is bent to protrude upward from the upper edge 86 of the attachment seat portion 85 and a front end 90b is directed toward the attachment bracket 100 at the front side. Specifically, in the case of the embodiment, the suspension portion 90 is formed so that a width direction substantially follows the vertical direction. That is, the suspension portion 90 is formed in a substantial L-shape in the side view as illustrated in FIGS. 9 and 11 and a locking protrusion 91 locked to the target suspension portion 105 protrudes downward from the front end 90b. The locking protrusion 91 can be locked to an edge 105b near a front upper end of the target suspension portion 105 while a lower face 90a of the suspension portion 90 contacts an upper face (an upper edge) 105a of the target suspension portion 105 (see FIG. 14). In the embodiment, the suspension portion 90 is disposed at the rear upper end of the casing 65 when the casing 65 is viewed from the horizontal direction. In other words, the suspension portion 90 is disposed at the rear upper end side position in relation to a gravity point GP of the airbag assembly AM (see FIG. 18). That is, in the embodiment, the suspension portion 90 is formed at a position where backward rotation moment M (see the two-dotted chain line in FIG. 18) is generated in the airbag assembly AM by using a portion near the locking protrusion 91 locked to the edge 105b of the target suspension portion 105 as a support point SP when the suspension portion 90 is suspended on the target suspension portion 105 formed at the attachment bracket 100 to temporarily fix the airbag assembly AM.

Figure 14:
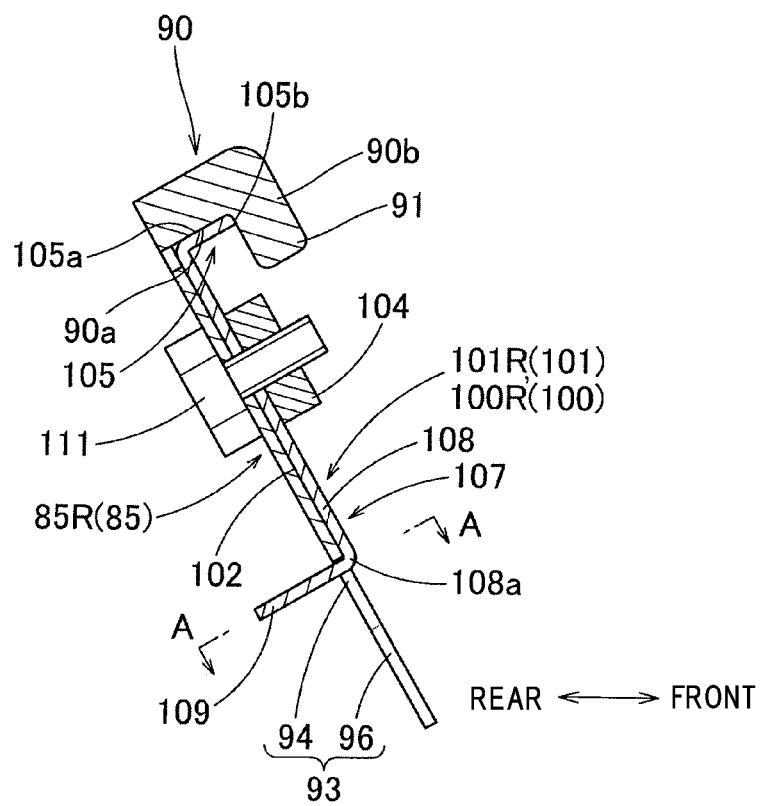
FIG. 14 is a cross-sectional view illustrating a state where an attachment seat portion of the casing in FIG. 7 is fixed to the fixation seat portion of the attachment bracket and is a diagram corresponding to a line XIV-XIV in FIG. 3.
Figure 14:
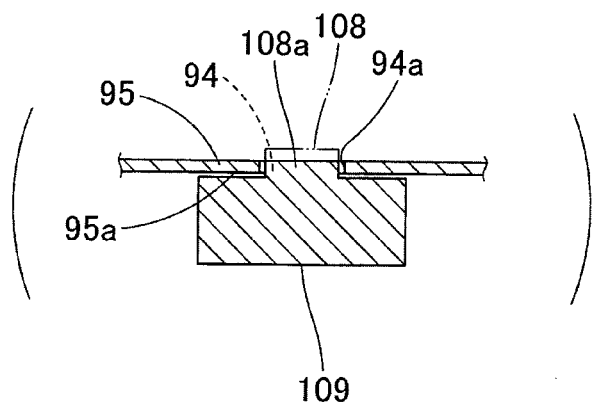
Figure 15:
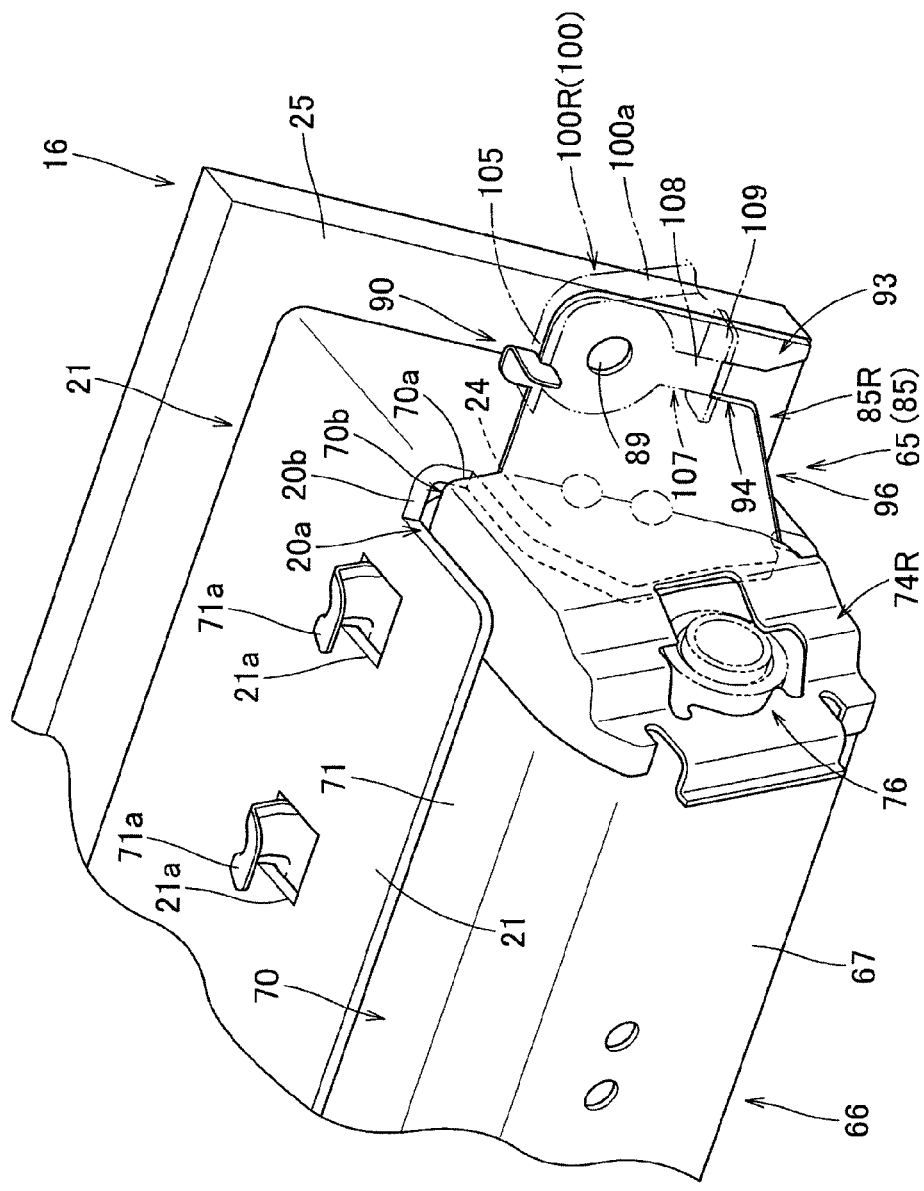
FIG. 15 is a partially enlarged perspective view schematically illustrating a state where the airbag cover is assembled to the casing.

As illustrated in FIG. 10, the engagement hole portion 93 which is an engagement portion is provided at a position right below the attachment hole 89 near the lower edge 87 of the attachment seat portion 85. That is, in the embodiment, the engagement hole portion 93 is formed at a position right below the suspension portion 90. The engagement hole portion 93 includes a concave portion 93a which is notched in a substantially rectangular shape from the lower edge 87 of the attachment seat portion 85 so that the lower end side is opened. The lower edge 87 of the attachment seat portion 85 includes an inner portion 87a which is located at the inside of the concave portion 93a in the horizontal direction and an outer portion 87b which is provided at the outside of the concave portion 93a in the horizontal direction and is inclined upward from the concave portion 93a. In the case of the embodiment, since the concave portion 93a is formed at a position located at the outside in relation to the center of the attachment seat portion 85 in the horizontal direction, a length dimension of the outer portion 87b is set to be smaller than that of the inner portion 87a and an inclination angle thereof with respect to the vertical direction is set to be larger than that of the inner portion 87a (see FIG. 10). Then, in the engagement hole portion 93 of the embodiment, the concave portion 93a which is notched in a substantially rectangular shape from the lower edge 87 of the attachment seat portion 85 forms a locking opening 94 and communicates with the locking opening 94 (the concave portion 93a) below the locking opening 94 (the concave portion 93a). An area surrounded by the tapered inner portion 87a and the outer portion 87b in the lower edge 87 of the attachment seat portion 85 is formed as an insertion opening 96. That is, in the engagement hole portion 93 of the embodiment, the insertion opening 96 is formed in a substantially trapezoidal shape of which a lower side is opened. The insertion opening 96 is formed so that a locking head portion 109 of the engagement piece portion 107 formed near the attachment bracket 100 is insertable therethrough and the inner peripheral faces of the inner portion 87a and the outer portion 87b of the lower edge 87 in the attachment seat portion 85 form an inner peripheral face 96a of the insertion opening 96 formed in a tapered shape to the locking opening 94. The tapered inner peripheral face 96a of the insertion opening 96 forms a guide face used to insert the engagement piece portion 107. Then, when a regulation neck portion 108 inserted through the insertion opening 96 is moved upward toward the locking opening 94, the regulation neck portion can be automatically guided toward the locking opening 94. The locking opening 94 is formed so that an opening width dimension H1 (see FIG. 10) is set to a size in which the regulation neck portion 108 of the engagement piece portion 107 is insertable therethrough and the locking head portion 109 is not insertable therethrough. As illustrated in FIG. 14, the relative movement of the regulation neck portion 108 in the horizontal direction can be regulated by the inner peripheral face 94a and the relative movement of the locking head portion 109 in the anteroposterior direction can be regulated by the peripheral edge 95.

In the case of the embodiment, as illustrated in FIG. 5, the attachment brackets 100 (100L and 100R) are formed to extend from the inner panel reinforcement member 2 near the body 1 and fixation seat portions 101 (101L and 101R) which are used to fix the attachment seat portions 85L and 85R of the casing 65 are provided at the front end (the lower end 100a). In the case of the embodiment, the fixation seat portions 101 (101L and 101R) are also formed to be symmetrical to each other in the horizontal direction.

Figure 12:
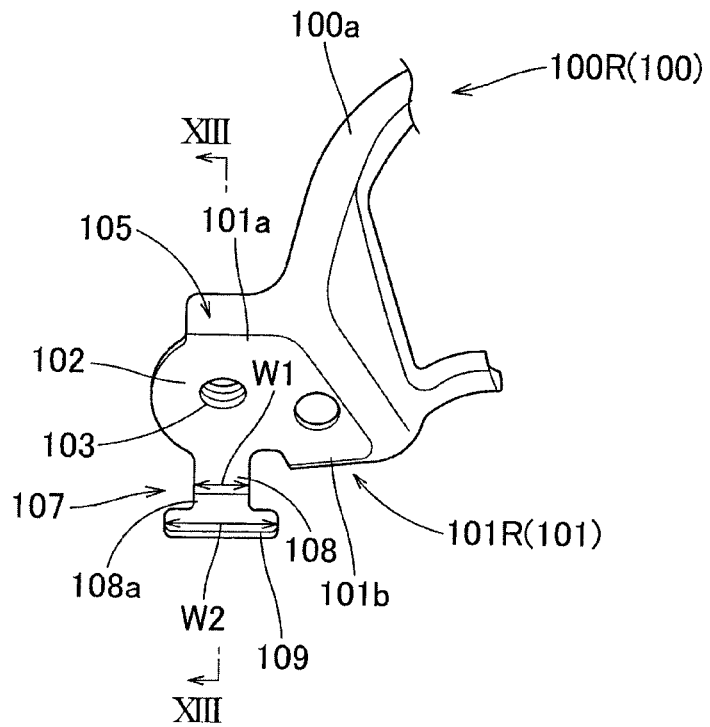
FIG. 12 is a partially enlarged front view illustrating a fixation seat portion of an attachment bracket used to attach the knee-protection airbag device of the embodiment to a body.
Figure 13:
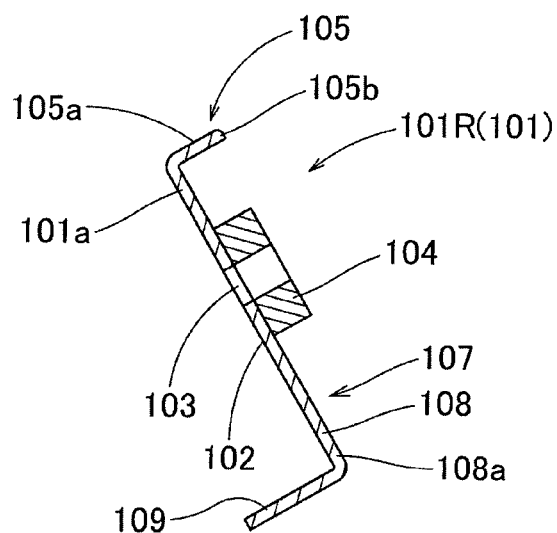
FIG. 13 is a partially enlarged cross-sectional view taken along a line XIII-XIII in FIG. 12.

As illustrated in FIGS. 3 and 14, each fixation seat portion 101 is formed so that the attachment seat portion 85 is able to contact a rear face 102. Then, the rear face 102 is inclined backward and upward with respect to the vertical direction along the attachment seat portion 85 so that an upper side is located at the rear side and a lower side is located at the front side. In the case of the embodiment, the fixation seat portion 101 is formed by bending a flat metallic plate member. As illustrated in FIGS. 12 and 13, the fixation seat portion 101 is provided with an attachment hole 103 through which the bolt 111 corresponding to a fixing member is insertable and a nut 104 which is fixed to the front peripheral edge of the attachment hole 103 so that the bolt 111 is threaded thereinto. The fixation seat portion 101R is provided with the target suspension portion 105 on which the suspension portion 90 formed at the attachment seat portion 85 of the casing 65 is suspended and the engagement piece portion 107 which serves as a target engagement portion engaging with the engagement hole portion 93 formed at the attachment seat portion 85.

In order to ensure strength, the fixation seat portion 101 of the embodiment is bent so that the upper edge 101a is directed forward and a portion near the upper edge 101a in the fixation seat portion 101 forms the target suspension portion 105 on which the suspension portion 90 is suspended. That is, as illustrated in FIG. 13, the target suspension portion 105 is bent so that a front end is directed forward. Here, the lower face 90a of the suspension portion 90 is brought into contact with the upper face 105a (the upper edge) and the locking protrusion 91 formed at the front end 90b of the suspension portion 90 is locked by the front end side edge 105b so that the suspension portion 90 is suspended on the target suspension portion (see FIGS. 14, 18, and 19).

The engagement piece portion 107 which is a target engagement portion extends obliquely forward and downward to substantially follow the rear face 102 of the fixation seat portion 101 from the lower edge 101b of the fixation seat portion 101 (see FIGS. 13 and 14). That is, the engagement piece portion 107 is formed to extend in the anteroposterior direction from the lower edge 101b of the fixation seat portion 101. As illustrated in FIGS. 12 and 13, the engagement piece portion 107 includes the regulation neck portion 108 which extends to be continuous from the fixation seat portion 101 along the rear face 102 of the fixation seat portion 101 and the locking head portion 109 which is formed at the front end 108a of the regulation neck portion 108.

The regulation neck portion 108 is formed in a substantial band shape of which a width direction substantially follows the horizontal direction and is formed so that a width dimension W1 (see FIG. 12) is a dimension in which the regulation neck portion is insertable through the locking opening 94 of the engagement hole portion 93. When the regulation neck portion 108 of the engagement piece portion 107 is inserted through the locking opening 94, the relative movement in the horizontal direction is regulated by the inner peripheral face 94a of the locking opening 94 and the width dimension W1 is set to be slightly smaller than the opening width dimension H1 of the locking opening 94 so that a large gap is not formed with respect to the inner peripheral face 94a when the regulation neck portion is inserted through the locking opening 94 (see FIG. 14). Further, in the case of the embodiment, the front end 108a (the lower end) of the regulation neck portion 108 is bent so that the locking head portion 109 protrudes toward the attachment seat portion 85R at the rear side.

Figure 18:
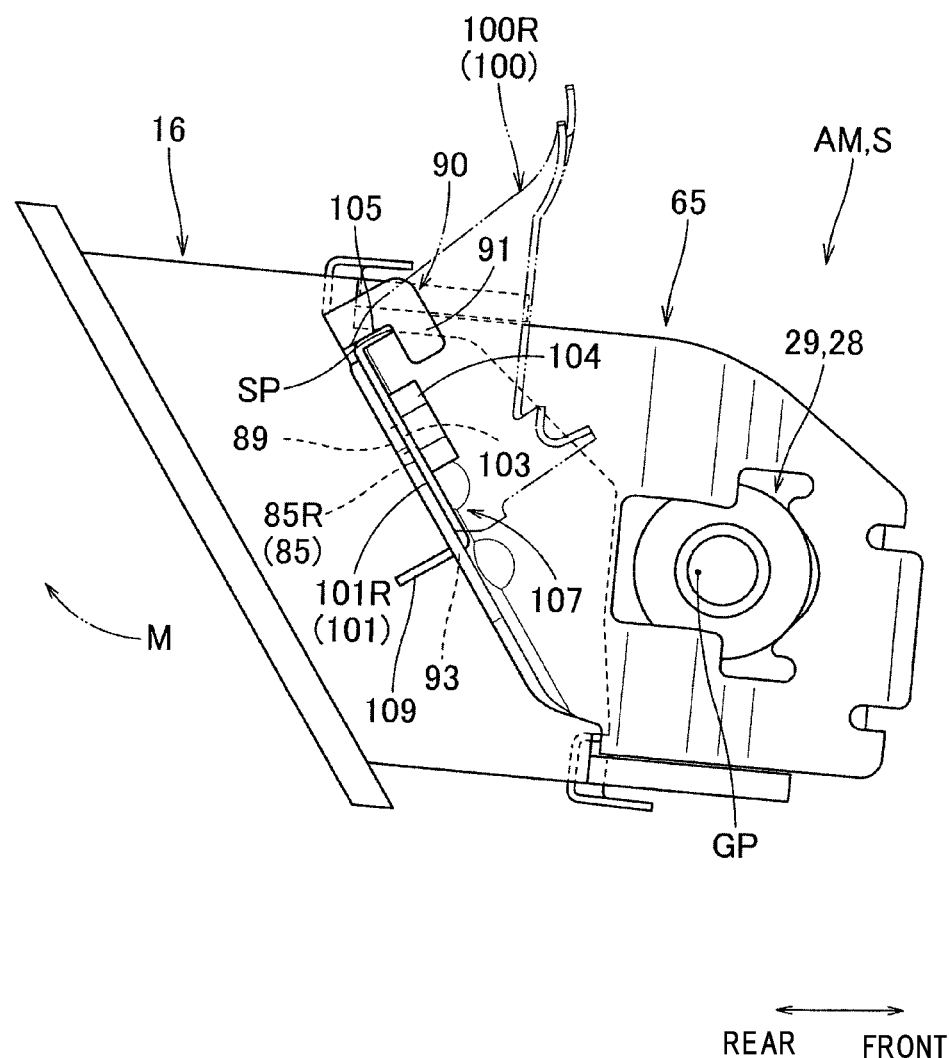
FIG. 18 is a right side view schematically illustrating a state where an airbag assembly of the knee-protection airbag device of the embodiment is temporarily fixed to an attachment bracket extending from the body.
Figure 19:
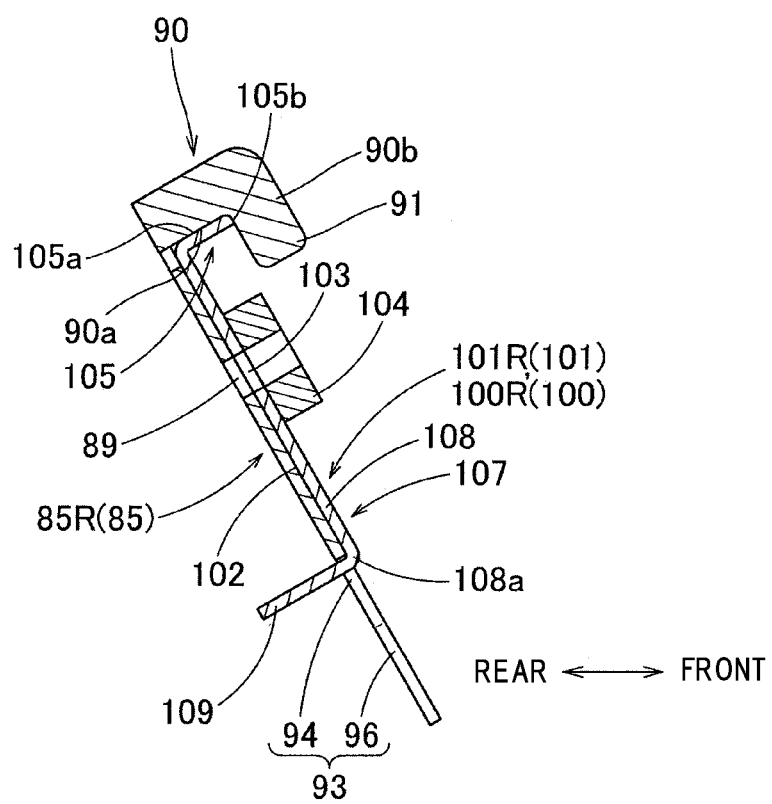
FIG. 19 is a longitudinal cross-sectional view illustrating a state where the attachment seat portion of the casing is temporarily fixed to the fixation seat portion of the attachment bracket.

The locking head portion 109 is formed to protrude toward both left and right sides from the front end 108a (the lower end) of the regulation neck portion 108 and is formed in a substantially rectangular plate shape having a large width in the horizontal direction. In the case of the embodiment, the locking head portion 109 is formed to protrude backward from the regulation neck portion 108. Specifically, the locking head portion 109 is formed to protrude backward while being substantially orthogonal to the regulation neck portion 108 when viewed from the horizontal direction (see FIG. 13). That is, the locking head portion 109 is disposed to be substantially orthogonal to the fixation seat portion 101 and the attachment seat portion 85 (see FIGS. 14, 18, and 19). The locking head portion 109 is formed so that the horizontal width dimension W2 (see FIG. 12) is larger than the opening width dimension H1 of the locking opening 94 and the locking head portion is locked to the peripheral edge 95 of the locking opening 94. Specifically, the locking head portion 109 is locked to the peripheral edge 95 of the locking opening 94 while the regulation neck portion 108 is inserted through the locking opening 94 so that the front edge 109a contacts the rear face 95a of the peripheral edge 95 of the locking opening 94 (see FIG. 14). In the embodiment, when the locking head portion 109 is locked to the peripheral edge 95 of the locking opening 94, the backward rotational movement of the airbag assembly AM can be regulated while the suspension portion 90 is suspended on the target suspension portion 105 and the deviation of the airbag assembly AM in the horizontal direction can be regulated. Then, in the embodiment, when the airbag assembly AM is temporarily fixed to the attachment bracket 100 extending toward the body 1 so that the suspension portion 90 is suspended on the target suspension portion 105 and the locking head portion 109 is locked to the peripheral edge 95 of the locking opening 94, the attachment seat portion 85 contacts the rear face 102 of the fixation seat portion 101 and the attachment hole 89 formed at the attachment seat portion 85 is disposed to match the attachment hole 103 formed at the fixation seat portion 101 as illustrated in FIG. 19.

Next, an operation of assembling the airbag assembly AM constituting the airbag device S of the embodiment will be described. First, the retainer 37 is received into the airbag 50 from the opening slit 53 so that the bolt 46 protrudes from the insertion hole 52. Then, the airbag 50 is folded to be received in the casing 65 while the locking claw portion 43 formed at the cylindrical portion 39 protrudes from the opening slit 53 and the airbag 50 is wrapped by a breakable wrapping material (not illustrated) for preventing a folding collapse. At this time, a portion of the peripheral edge of the opening slit 53 is exposed from the wrapping material.

Next, the inflator body 29 is inserted into the airbag 50 (the cylindrical portion 39 of the retainer 37) from the gas ejection portion 31 through the opening slit 53. At this time, the inflator body 29 is inserted until the left end face 30f of the main body portion 30 contacts the projection piece 42 formed at the cylindrical portion 39 of the retainer 37. Then, the folded airbag 50 and the inflator 28 are received into the casing body 66 so that the bolt 46 protrudes from the bottom wall portion 67 and the nut 47 is fastened to the bolt 46 protruding from the bottom wall portion 67 so that the airbag 50 and the inflator 28 are attached to the casing body 66. When the nut 47 is fastened, the retainer 37 moves the cylindrical portion 39 covering the outer periphery of the inflator body 29 toward the bottom wall portion 67. Then, the support protrusion 68 formed at the bottom wall portion 67 is disposed so that the front end 68a contacts the outer peripheral face 30e of the center side portion 30d of the main body portion 30 in the inflator body 29, the inflator body 29 is pressed toward the rear side of the vehicle, and the outer peripheral face 30e of the center side portion 30d of the main body portion 30 in the inflator body 29 contacts the front end face 41a of each protrusion 41 of the contact portion 40 formed at the cylindrical portion 39. At this time, the outer peripheral face 30b of the right end side portion 30a near the connection port 32 in the main body portion 30 of the inflator body 29 contacts the guide faces 79 and 79 of the guide portion 78 formed near the front edge 77a of the opening body 77 in the connector opening 76 formed at the right wall portion 74R of the casing 65 and the inflator body 29 moves toward the bottom wall portion 67 to be supported by the guide portion 78 while the contact state of the outer peripheral face 30b with respect to the guide faces 79 and 79 is kept. Then, the right end side portion 30a at the front side of the vehicle is supported by the guide portion 78 while the inflator body 29 is retained in the retainer 37 so that the center side portion 30d of the main body portion 30 is sandwiched by the front end faces 41a of four protrusions 41 disposed at the rear side of the vehicle and the front end 68a of one support protrusion 68 disposed at the front side of the vehicle and thus the inflator is attached to the casing body 66.

Then, the left wall portion 23 and the right wall portion 24 are inserted into the peripheral wall portion 70, the airbag cover 16 is disposed at the outer periphery of the casing body 66 to cover the projection opening 66a by the door portion 18 while the corner portion 70b of the peripheral edge 70a of the projection opening 66a in the peripheral wall portion 70 of the casing body 66 is inserted into the concave portion 20a, the locking claw portions 71a and 72a are respectively locked to the peripheral edges of the locking holes 21a and 22a, and the airbag cover 16 is assembled to the casing body 66, thereby assembling the airbag assembly AM.

Then, in the airbag assembly AM assembled in this way, the airbag assembly AM is rotated forward and downward about the vicinity of the suspension portion 90 while the suspension portions 90 formed at the attachment seat portions 85L and 85R of the casing 65 are suspended on the target suspension portions 105 formed at the fixation seat portions 101L and 101R of the attachment brackets 100L and 100R extending toward the body 1, the regulation neck portion 108 and the locking head portion 109 of the engagement piece portion 107 are inserted through the insertion opening 96 of the engagement hole portion 93, and the regulation neck portion 108 is inserted through the locking opening 94. Then, when the locking head portion 109 is locked to the peripheral edge 95 of the locking opening 94, the airbag assembly AM can be temporarily fixed to the attachment bracket 100 extending toward the body 1 as illustrated in FIG. 18. At this time, as illustrated in FIG. 19, each attachment seat portion 85 is disposed to contact the rear face 102 of each fixation seat portion 101 so that the attachment hole 89 matches the attachment hole 103 formed at each fixation seat portion 101. Then, when the bolt 111 which is a fixing member is inserted through the attachment holes 89 and 103 and is fastened to the nut 104 fixed to the rear face of the attachment hole 103, the peripheral edge of the attachment hole 89 in the attachment seat portion 85 can be fixed to the rear face 102 of the fixation seat portion 101 and the airbag assembly AM can be fixed to the body 1 as illustrated in FIGS. 3 and 14. Then, the connector 34 connected to the lead wire 35 extending from an airbag operation circuit is connected to the connection port 32 of the inflator body 29 exposed from the connector opening 76 of the casing 65. Then, when the airbag device S is attached to an inner panel 12 or an undercover 13 (see FIGS. 1 and 2), the airbag device S can be attached to the vehicle.

When an operation signal is input to the inflator body 29 via the lead wire 35 after the airbag device S is mounted on the vehicle, an inflating gas is ejected from a gas ejection port 31a of the inflator body 29 and flows into the airbag 50. Then, the inflating gas flows into the airbag 50 so that the airbag is expanded. Subsequently, the wrapping material (not illustrated) is broken and the door portion 18 of the airbag cover 16 is pressed so that the door portion 18 breaks the peripheral rupture expected portion 18a. Accordingly, the door portion is opened upward and downward by using the hinge portion 18b as a rotation center. Then, the airbag 50 protrudes toward the rear side of the vehicle from the projection opening 66a of the casing body 66 and thus the airbag 50 is completely expanded as indicated by the two-dotted chain line in FIGS. 1 and 5.

Then, in the airbag device S of the embodiment, the airbag assembly AM is attached to the body 1 when the attachment seat portion 85 formed at the casing 65 is attached to the attachment bracket 100 extending toward the body 1. Here, the airbag assembly AM is fixed to the body 1 when the peripheral edge of the attachment hole 89 formed at the attachment seat portion 85 is fixed to the rear face 102 of the fixation seat portion 101 formed at the attachment bracket 100 by using the bolt 111 which is a fixing member while the airbag assembly AM is temporarily fixed to the attachment bracket 100 in such a manner that the suspension portion 90 formed at the casing 65 is suspended on the upper face 105a (the upper edge) of the target suspension portion 105 formed at the attachment bracket 100 and the engagement hole portion 93 which is an engagement portion formed at the casing 65 engages with the engagement piece portion 107 which is a target engagement portion formed at the attachment bracket 100. Then, in the airbag device S of the embodiment, the downward movement of the airbag assembly AM is regulated in such a manner that the suspension portion 90 is suspended on the upper face 105a (the upper edge) of the target suspension portion 105 formed at the attachment bracket 100 and the backward rotation of the airbag assembly AM with respect to the attachment bracket 100 and the horizontal deviation thereof are suppressed in such a manner that the engagement hole portion 93 which is an engagement portion engages with the engagement piece portion 107 which is a target engagement portion. For that reason, the airbag assembly AM can be temporarily fixed to the attachment bracket 100 while the horizontal deviation of the airbag assembly is suppressed in addition to the restriction of the downward movement or the backward rotation.

As a result, in the airbag device S of the embodiment, if the airbag assembly AM is temporarily fixed to the attachment bracket 100 by using the suspension portion 90, the target suspension portion 105, the engagement hole portion 93, and the engagement piece portion 107 when the airbag assembly AM is fixed to the body 1, it is possible to stabilize the position of the airbag assembly AM with respect to the attachment bracket 100 while the airbag assembly AM is not supported by a hand or the like. Further, if the attachment seat portion 85 contacts the rear face 102 of the fixation seat portion 101, it is possible to align the attachment hole 89 formed at the attachment seat portion 85 to the attachment hole 103 formed at the fixation seat portion 101 and thus to smoothly fix the airbag assembly AM to the body 1 by using the bolt 111 which is a fixing member.

Thus, in the airbag device S of the embodiment, the airbag assembly AM can be stably and temporarily fixed when the airbag assembly AM is fixed to the body 1 and thus the workability is satisfactory when the airbag assembly M is fixed to the body 1.

Specifically, in the airbag device S of the embodiment, the engagement portion and the target engagement portion are formed as the engagement piece portion 107 and the engagement hole portion 93. The engagement piece portion 107 includes the regulation neck portion 108 and the locking head portion 109 which is formed at the front end 108a of the regulation neck portion 108. The engagement hole portion 93 includes the insertion opening 96 through which the locking head portion 109 is insertable and the locking opening 94 which communicates with the insertion opening 96 and locks the locking head portion 109 by the peripheral edge 95 while the regulation neck portion 108 is insertable therethrough. Further, the locking opening 94 regulates the relative movement of the regulation neck portion 108 in the horizontal direction by the inner peripheral face 94a so that the deviation of the airbag assembly AM in the horizontal direction is regulated and locks the locking head portion 109 by the peripheral edge 95 so that the backward movement of the airbag assembly AM is regulated.

For that reason, in the airbag device S of the embodiment, when the regulation neck portion 108 is inserted into the locking opening 94 through the insertion opening 96 of the engagement hole portion 93, the relative movement of the regulation neck portion 108 in the horizontal direction can be regulated by the inner peripheral face 94a of the locking opening 94 and the deviation of the airbag assembly AM in the horizontal direction can be suppressed. Further, when the locking head portion 109 disposed at the front end 108a of the regulation neck portion 108 is locked by the peripheral edge 95 of the locking opening 94, the backward rotation of the airbag assembly AM can be regulated. Further, in the airbag device S of the embodiment, the locking head portion 109 can be locked to the peripheral edge 95 of the locking opening 94 only in such a manner that the engagement piece portion 107 is moved so that the regulation neck portion 108 and the locking head portion 109 are inserted into the insertion opening 96 and the regulation neck portion 108 is inserted into the locking opening 94. Accordingly, the locking operation is easy and the temporary fixing operation can be smoothly performed even when a working space is narrow due to many peripheral components.

In the airbag device S of the embodiment, since the locking head portion 109 is formed to protrude toward both left and right sides from the front end 108a of the regulation neck portion 108, the locking head portion 109 can be locked to the peripheral edge 95 of the locking opening 94 in a wide horizontal area and thus the locking head portion 109 can be further strongly locked to the peripheral edge 95 of the locking opening 94. Further, in the embodiment, the locking head portion 109 is formed to protrude toward both left and right sides from the front end 108a of the regulation neck portion 108, but the locking head portion 109 may be formed to protrude from the front end of the regulation neck portion toward one side in the horizontal direction. For example, when the locking opening is formed in a tapered shape so that the opening width dimension is narrowed from an insertion concave portion toward the front end, the locking head portion may not protrude toward the left and right sides from the regulation neck portion. Here, the locking head portion may be formed from the front end side portion of the regulation neck portion substantially having the same width dimension as that of the regulation neck portion and may be locked to the peripheral edge of the front end side narrow area of the locking opening.

In the airbag device S of the embodiment, the engagement hole portion 93 is formed near the casing 65, that is, the engagement piece portion 107 protrudes from the periphery of the attachment bracket 100. For that reason, the operator can easily see the engagement piece portion 107 and further easily perform the temporary fixing operation when the airbag assembly AM is temporarily fixed to the attachment bracket 100 compared with the case where the engagement piece portion is provided at the casing. Particularly, in the airbag device S of the embodiment, since the locking head portion 109 is disposed to be bent with respect to the regulation neck portion 108 and is formed to protrude from the regulation neck portion 108 toward the rear side of the vehicle, the engagement piece portion 107 can further easily engage with the engagement hole portion 93. Further, when the above-described points are not taken into consideration, the engagement piece portion may be formed near the casing and the engagement hole portion may be formed near the attachment bracket.

In the airbag device S of the embodiment, the insertion opening 96 of the engagement hole portion 93 is formed so that the inner peripheral face 96a is formed in a tapered shape to the locking opening 94 and is formed as an insertion guide face for the engagement piece portion 107. Accordingly, when the regulation neck portion 108 is inserted into the insertion opening 96 toward a direction near the locking opening 94 (in the case of the embodiment, upward) during the downward movement of the casing 65, the regulation neck portion 108 can be moved to be inserted into the locking opening 94 while being guided by the guide face (the inner peripheral face 96a) and thus the locking head portion 109 can be automatically locked to a locking position inside the locking concave portion 94. For that reason, when the working space is narrow and the operator cannot easily see the engagement hole portion, the regulation neck portion 108 can be smoothly inserted into the locking opening 94 and thus the regulation neck portion 108 can be further easily inserted into the locking opening 94. Particularly, in the airbag device S of the embodiment, the insertion opening 96 is formed as an area surrounded by the inner portion 87a and the outer portion 87b of the lower edge 87 of the attachment seat portion 85. In other words, the insertion opening 96 is formed so that the lower side is largely opened. For that reason, the locking head portion 109 can be easily inserted through the insertion opening 96. When such points are not taken into consideration, the inner peripheral edge of the insertion opening which is an engagement hole portion may not be formed in a tapered shape and the insertion opening may be simply opened in a substantial "convex" shape. Further, the lower edge of the attachment seat portion may be formed in a linear shape substantially following the horizontal direction, and a concave portion may be formed from the lower edge to be notched in a substantially rectangular shape, and the concave portion is formed as the locking opening, thereby forming the engagement hole portion. When the engagement hole portion has such a configuration, the insertion opening is formed by the area of the lower free space of the attachment seat portion.

In the airbag device S of the embodiment, the attachment seat portions 85L and 85R and the attachment brackets 100L and 100R are formed at both left and right positions of the casing 65 and respectively include the suspension portion 90 and the target suspension portion 105 which correspond to each other and the engagement hole portion 93 serving as an engagement portion and the engagement piece portion 107 serving as a target engagement portion which correspond to each other. For that reason, the airbag assembly AM can be temporarily fixed to the body 1 with a balance in the horizontal direction, the position of the airbag assembly AM with respect to the attachment bracket 100 can be further stabilized, and the attachment seat portion 85 can be further stably disposed at the attachment position of the fixation seat portion 101. When the airbag assembly can be stably and temporarily fixed to the attachment bracket, the attachment seat portion and the attachment bracket may not be disposed at both left and right sides of the casing. Further, even when the attachment seat portion and the attachment bracket are disposed at both left and right sides of the casing, the suspension portion and the target suspension portion may not be disposed in both components along with the engagement portion and the target engagement portion. For example, a configuration may be employed in which only the suspension portion and the target suspension portion are provided in any one of the attachment seat portion and the attachment bracket at one side in the horizontal direction and only the engagement portion and the target engagement portion are provided in the attachment seat portion and the attachment bracket at the other side in the horizontal direction.

As in the embodiment, when the engagement hole portion 93 and the engagement piece portion 107 are formed in the attachment bracket 85 and the fixation seat portion 101 at both sides in the horizontal direction, a pair of the components disposed at one side in the horizontal direction may be formed with high precision and a pair of the component disposed at the other side in the horizontal direction may be formed in consideration of an assembly error. As for preventing the deviation in the horizontal direction due to the regulation neck portion 108 and the locking opening 94, the deviation in the horizontal direction may not be regulated by the inner peripheral face of each locking opening when the engagement hole portion 93 and the engagement piece portion 107 are formed in the attachment bracket 85 and the fixation seat portion 101 at both left and right sides as in the embodiment. For example, a configuration may be employed in which the deviation in the horizontal direction is regulated by the inner peripheral face of the edge disposed to face the inside in the horizontal direction of each locking opening. On the contrary, a configuration may be employed in which the deviation in the horizontal direction is regulated by the inner peripheral face of the outer edge separated in the horizontal direction of each locking opening.

In the embodiment, the knee-protection airbag device S disposed in front of the driver seat has been exemplarily described, but the invention can be also applied to a knee-protection airbag device disposed in front of an assistant seat to protect knees of an occupant sitting on the assistant seat.

What is claimed is:

1. A knee-protection airbag device comprising:
an airbag being inflatable when an inflating gas flows thereinto; and
a casing receiving the airbag in a folded state, wherein:
the airbag and the casing constitute an airbag assembly, which is disposed in front of knees of an occupant sitting on a seat and which is fixed to a body by the use of an attachment bracket;
the casing includes an attachment seat portion attached to the attachment bracket disposed to extend from the body;
the airbag assembly is fixed to the body when a peripheral edge of an attachment hole of the attachment seat portion is fixed to a rear face of a fixation seat portion formed at the attachment bracket by the use of a fixing member;
the casing is disposed so that a suspension portion suspending on an upper edge of a target suspension portion formed at the attachment bracket extends toward the attachment bracket;
the casing includes an engagement portion engaging with a target engagement portion formed at the attachment bracket;
when the engagement portion engages with the target engagement portion while the suspension portion is suspended on the target suspension portion, the airbag assembly is suppressed from rotating backward and deviating in a horizontal direction; and
when the attachment seat portion contacts the rear face of the fixation seat portion, the attachment hole formed at the attachment seat portion matches an attachment hole formed at the fixation seat portion.

2. The knee-protection airbag device according to claim 1, wherein:
the engagement portion and the target engagement portion include:
an engagement piece portion, formed at one of the attachment bracket and the casing to extend in an anteroposterior direction, including a regulation neck portion and a locking head portion formed at a front end of the regulation neck portion; and
an engagement hole portion, formed at one of the attachment bracket and the attachment seat portion, including an insertion opening used to insert the locking head portion therethrough and a locking opening formed to communicate with the insertion opening and locking the locking head portion by a peripheral edge while the regulation neck portion is inserted therethrough; and
the locking opening regulates a relative movement of the regulation neck portion in the horizontal direction by an inner peripheral face to regulate a deviation of the airbag assembly in the horizontal direction and locks the locking head portion by the peripheral edge to regulate a backward movement of the airbag assembly.

3. The knee-protection airbag device according to claim 2, wherein
the locking head portion is formed to protrude from a front end of the regulation neck portion toward at least one side in the horizontal direction.

4. The knee-protection airbag device according to claim 2, wherein
the engagement hole portion is formed at the casing.

5. The knee-protection airbag device according to claim 4, wherein
the insertion opening is formed so that an inner peripheral face is formed in a tapered shape to the locking opening and is formed as a guide face used to insert the engagement piece portion therethrough.

6. The knee-protection airbag device according to claim 1, wherein
the attachment seat portion and the attachment bracket are formed at both left and right sides of the casing and respectively include the suspension portion and the target suspension portion which correspond to each other and the engagement portion and the target engagement portion which correspond to each other.

* * * * *